(12) United States Patent
Kosslyn

(10) Patent No.: US 9,686,586 B2
(45) Date of Patent: Jun. 20, 2017

(54) INTERSTITIAL AUDIO CONTROL

(71) Applicant: Google Inc., Mountain View, CA (US)

(72) Inventor: David Alan Kosslyn, San Francisco, CA (US)

(73) Assignee: Google Inc., Mountian View, CA (US)

( * ) Notice: Subject to any disclaimer, the term of this patent is extended or adjusted under 35 U.S.C. 154(b) by 0 days.

(21) Appl. No.: 14/453,510

(22) Filed: Aug. 6, 2014

(65) Prior Publication Data

US 2015/0012938 A1  Jan. 8, 2015

Related U.S. Application Data

(62) Division of application No. 13/842,452, filed on Mar. 15, 2013, now Pat. No. 8,813,120.

(51) Int. Cl.
*H04N 7/025* (2006.01)
*H04N 21/439* (2011.01)
(Continued)

(52) U.S. Cl.
CPC ... *H04N 21/4394* (2013.01); *G06F 17/30743* (2013.01); *H04N 21/233* (2013.01); *H04N 21/43* (2013.01); *H04N 21/435* (2013.01); *H04N 21/439* (2013.01); *H04N 21/4621* (2013.01); *H04N 21/4825* (2013.01); *H04N 21/812* (2013.01); *H04N 21/8106* (2013.01)

(58) Field of Classification Search
CPC ............. H04N 21/439; H04N 21/8106; H04N 21/812; H04N 5/2723; H04N 21/4852; H04N 21/25891; H04N 21/4394; H04N 21/233; H04N 21/4396; H04N 5/60; G06F 17/30743; G06F 11/2069; G06F 3/067; G06F 3/0608; G06F 3/0665; G06F 3/0631; G06F 3/0683; G06F 11/2058; G06F 11/2064; G06F 11/2071; G06F 3/0604; G06F 3/0635; G06F 17/30079; G06F 17/30165; G06F 3/0647
USPC ...... 725/25, 18, 34, 32; 348/E9.002, 231.99, 348/462, 512
See application file for complete search history.

(56) References Cited

U.S. PATENT DOCUMENTS 4,406,923 A * 9/1983 Burne et al. .................. 381/108
5,666,430 A * 9/1997 Rzeszewski .................. 381/107
(Continued)

OTHER PUBLICATIONS

USPTO Notice of Allowance for U.S. Appl. No. 13/842,452, mailed Apr. 1, 2014, 26 pages.

*Primary Examiner* — Nathan Flynn
*Assistant Examiner* — Cynthia Fogg
(74) *Attorney, Agent, or Firm* — Lowenstein Sandler LLP

(57) ABSTRACT

A method for audio matching may include sending a request to an external server to deliver a plurality of main media segments to the media device, receiving a first main media segment, and playing the received first main media segment. The method may further include determining audio parameters of the first main media segment, determining audio parameters of a first interstitial media segment to be served in proximity to the first main media segment, determining when the audio parameters of the first interstitial media segment are to be adjusted to match the audio parameters of the first main media segment, adjusting the audio parameters of the first interstitial media segment, and playing the first main video followed by the first interstitial media segment.

20 Claims, 13 Drawing Sheets

(51) Int. Cl.
*H04N 21/233* (2011.01)
*H04N 21/43* (2011.01)
*G06F 17/30* (2006.01)
*H04N 21/435* (2011.01)
*H04N 21/462* (2011.01)
*H04N 21/81* (2011.01)
*H04N 21/482* (2011.01)

(56) References Cited

U.S. PATENT DOCUMENTS

| | | | |
|---|---|---|---|
| 5,771,301 A * | 6/1998 | Fuller | H03G 7/002 |
| | | | 381/104 |
| 5,778,077 A * | 7/1998 | Davidson | 381/57 |
| 5,822,018 A * | 10/1998 | Farmer | 348/705 |
| 6,552,753 B1 * | 4/2003 | Zhurbinskiy et al. | 348/738 |
| 7,298,962 B2 | 11/2007 | Quan et al. | |
| 8,849,434 B1 * | 9/2014 | Pontual et al. | 700/94 |
| 2003/0115597 A1 | 6/2003 | Yassin et al. | |
| 2003/0191816 A1 | 10/2003 | Landress et al. | |
| 2004/0062520 A1 | 4/2004 | Gutta et al. | |
| 2004/0199420 A1 * | 10/2004 | Bhakta et al. | 705/14 |
| 2005/0149968 A1 | 7/2005 | Konig et al. | |
| 2005/0271224 A1 * | 12/2005 | Hsieh | H03G 3/3089 |
| | | | 381/104 |
| 2006/0013414 A1 * | 1/2006 | Shih | H03G 3/3005 |
| | | | 381/107 |
| 2006/0059509 A1 | 3/2006 | Huang et al. | |
| 2006/0092335 A1 | 5/2006 | Strickland et al. | |
| 2006/0101486 A1 * | 5/2006 | Kar et al. | 725/32 |
| 2007/0016918 A1 | 1/2007 | Alcorn et al. | |
| 2007/0086604 A1 * | 4/2007 | Guillorit | 381/107 |
| 2007/0130581 A1 | 6/2007 | Del Sesto et al. | |
| 2008/0092159 A1 * | 4/2008 | Dmitriev et al. | 725/34 |
| 2008/0127247 A1 * | 5/2008 | Allen | H04N 7/163 |
| | | | 725/32 |
| 2008/0209066 A1 * | 8/2008 | Spio et al. | 709/231 |
| 2009/0161883 A1 * | 6/2009 | Katsianos | 381/57 |
| 2010/0109926 A1 * | 5/2010 | Medina et al. | 341/144 |
| 2010/0128904 A1 * | 5/2010 | Hanna et al. | 381/107 |
| 2010/0138761 A1 * | 6/2010 | Barnes | 715/764 |
| 2010/0169925 A1 * | 7/2010 | Takegoshi | H04N 5/445 |
| | | | 725/40 |
| 2010/0322592 A1 * | 12/2010 | Casagrande | 386/241 |
| 2011/0004899 A1 | 1/2011 | Medford | |
| 2011/0051016 A1 * | 3/2011 | Malode | H03G 1/02 |
| | | | 348/734 |
| 2011/0082824 A1 | 4/2011 | Allison et al. | |
| 2012/0124474 A1 * | 5/2012 | Suh et al. | 715/717 |
| 2012/0173342 A1 | 7/2012 | Rajaopadhye | |
| 2013/0305279 A1 | 11/2013 | Candelore | |
| 2014/0373044 A1 * | 12/2014 | Carrol | H04H 60/06 |
| | | | 725/32 |

* cited by examiner

# INTERSTITIAL AUDIO CONTROL

RELATED APPLICATIONS

This application is a divisional of U.S. patent application Ser. No. 13/842,452 filed on Mar. 15, 2013, the entire contents of which are hereby incorporated by referenced herein.

BACKGROUND

Media devices may provide viewers with media content interspersed with promotionals. Some media content includes audio content; the interspersed promotionals, likewise, may include audio content. However, when media content and interspersed promotionals are presented in serial fashion, the audio volume levels of the media content and the interspersed promotionals, as provided on the media devices, may be sufficiently different as to make the viewer's experience less than satisfactory, or even uncomfortable. In the context of videos, one reason for this situation is that a video program producer may set the base audio level of a video at one level, and the producer of a promotional may set the base audio level of the promotional at a higher level. Thus, a viewer may be watching and listening to a video with the audio volume set at a comfortable level but when an interspersed promotional plays, the volume level is higher. In this situation, the viewer may manually adjust down or mute the media device volume while the promotional plays and then manually adjust up or unmute the media device volume when the video plays. Besides being annoying to the viewer, such volume adjustments may lessen the effectiveness of the promotional.

SUMMARY

A system and method implemented by the system allows a viewer to receive media content and interspersed promotionals without the need to manually adjust the volume of the viewer's media device when the media device switches from playing the media content to playing the promotionals and vice versa.

A method includes determining a base audio level of a media content, determining interstitials in the media content during which promotionals may be played, and providing promotionals to play in the interstitials such that a base audio level of a promotional matches the base audio level of the media content.

A method executed on a processor which controls audio during playing of a video segment. The method includes receiving a request to play one or more main videos; noting a request for audio matching among the main videos and one or more interstitial videos; determining requested audio parameters for the audio matching; identifying a first interstitial in the main videos in which the interstitial videos may be served, the first interstitial in proximity to a first main video; locating one or more candidate interstitial videos to serve in the first interstitial by matching audio parameters of each of the candidate videos and audio parameters of at least the first main video; and selecting to serve in the first interstitial, one or more interstitial videos having a closest audio match to the first main video.

The above disclosure generally refers to media as video. However, the systems and methods may apply to any type of media, including radio. In general, the disclosure relates to an audio matching system and a corresponding audio matching method for controlling interstitial media in any media type. The method includes sending, by a processor, a request to an external server to deliver a plurality of main media segments to the media device; receiving, at the media device, a first main media segment playing, at the media device, the received first main media segment; determining, by the processor, audio parameters of the first main media segment; determining, by the processor, audio parameters of a first interstitial media segment to be served in proximity to the first main media segment; determining, by the processor, when the audio parameters of the first interstitial media segment require adjustment to match those of the first main media segment; when audio parameter adjustment is required, adjusting, by the processor, the audio parameters of the first interstitial media segment; and playing the first main video followed by the first interstitial video.

BRIEF DESCRIPTION OF THE DRAWINGS

The present disclosure is illustrated by way of example, and not by way of limitation, in the figures of the accompanying drawings.

DETAILED DESCRIPTION

Figure 1:
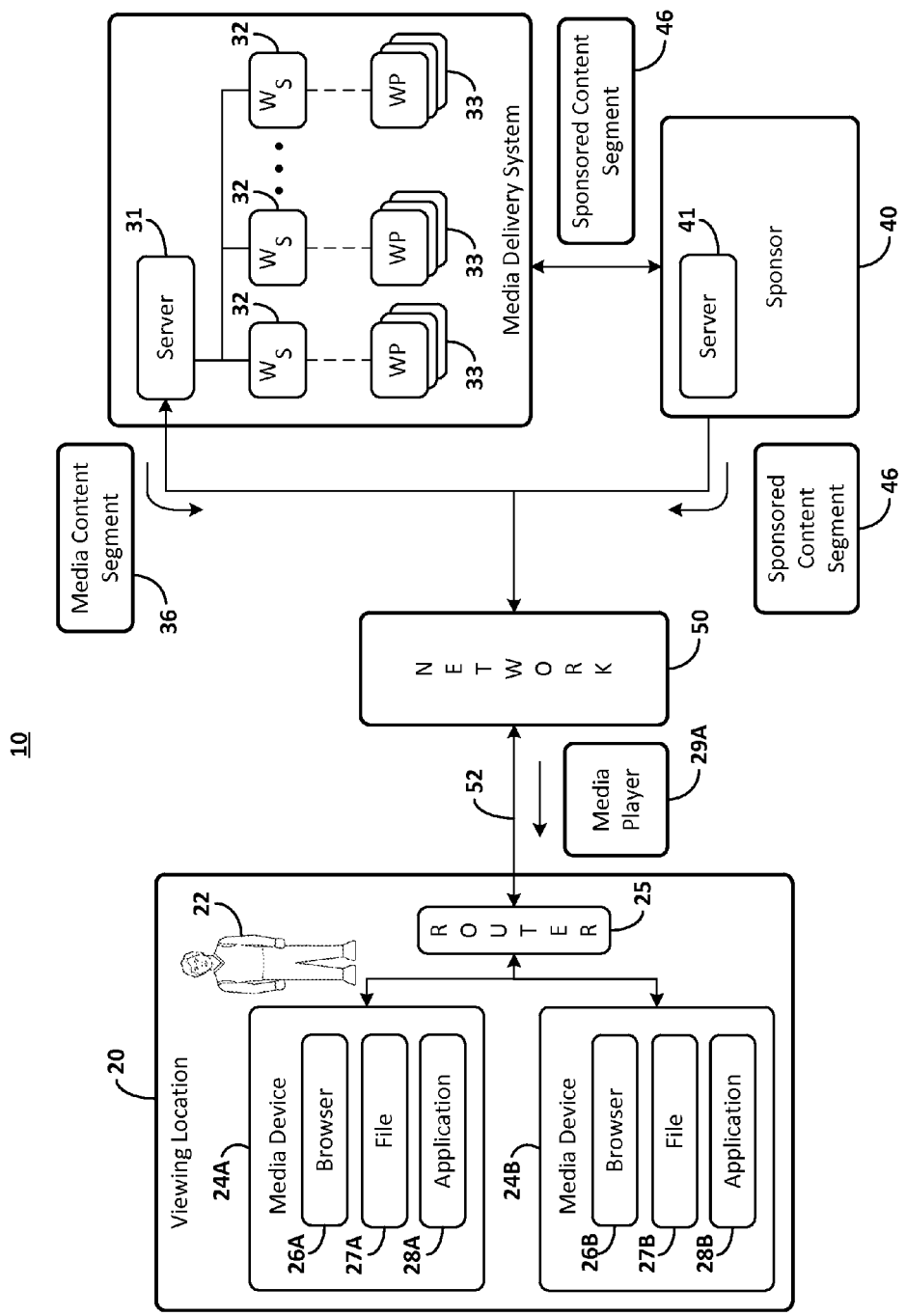
FIG. 1 illustrates an example environment in which audio parameters of media may be controlled.

Media devices may provide viewers the ability to view a succession of media content segments, for example, a succession of videos. The videos may be interspersed with sponsored content segments, for example, advertisements. In one situation, one or more video advertisements may be interspersed between the videos. Some or all of the videos may include audio content; likewise, the interspersed advertisements may include audio content. However, when videos and interspersed advertisements are presented in this serial fashion, the audio volume levels of the videos and the interspersed advertisements, as presented on the media devices, may be sufficiently different as to make the viewers' experience less than satisfactory, or even uncomfortable. One reason for this situation is that a video producer may set the base audio level of a video at one level, and the producer of an advertisement may set the base audio level of the advertisement at a much higher level. Thus, a viewer may be watching and listening to a video with the audio volume set at a comfortable level but when an interspersed advertisement plays, the volume level "jumps" to a higher level. Large jumps in audio levels between and among different content segments may be disconcerting to the viewer. With current media delivery systems, the viewer's only options may be to put up with the volume changes or to manually adjust down or mute the media device volume while the advertisement plays and then manually adjust up or unmute the media device volume when the video plays. Besides being annoying to the viewer, such volume adjustments may lessen the effectiveness of the promotional.

In one aspect, the herein disclosed systems and methods address the problem of having large jumps in audio levels between videos and video advertisements, or between a main piece of video (or audio-only) content (referred to here as main video(s)) and an interstitial piece of content (referred to here as an interstitial video). The systems and methods may use one or more of at least are two different approaches. A first approach involves scaling the audio within an interstitial video to reflect the audio in a main video; for example, this approach scales the audio of a video advertisement to reflect the audio of the "auditory bookends" of the main video—or the moments in audio immediately before and after the video advertisement. This first approach thus scales all audio within the overall viewing (and listening) experience (i.e., the main video and the interstitial video) to be within a selected or designated range. In this first approach, each time an interstitial video (e.g., a video advertisement) is set to play, its maximum and minimum audio levels and/or its base audio level may be scaled to reflect the maximum and minimum ranges and/or base audio level of video clips on either side (the "bookends") of the interstitial video. In this first approach, the video clips may be portions of a single main video, or may be separate and distinct main videos, or portions of separate and distinct main videos. For example, a video advertisement may be set to play between two music videos (for example between music videos in a music video playlist). The audio of the video advertisement may be scaled to reflect the audio of the preceding and following music videos, or to reflect an ending portion of the preceding music video and the beginning of the following music video. This means that, for example, that the loudest sound within the interstitial video is scaled to be no louder than the loudest sound in the main video(s).

In this first approach, there are at least two options for achieving the audio scaling (or audio control or audio matching). In a first option, where main and interstitial videos are streamed to a viewer's media device, as the media content begins to stream from a remote media server, the media content passes through a filter that adjusts the audio level of the streamed media content. Thus, in this first option, the audio spectrum of the interstitial is modified as or before the interstitial video leaves the remote media server.

In a second option, audio matching code running in a media player (for example, a media player within the browser) runs when an interstitial video begins to play. At that time, the audio matching code scales the audio (volume) being sent to the media device's speakers to reflect that of the preceding, and perhaps following main video. In this second option, the audio spectrum of the interstitial video is sent to the media device, but the media player within the media device modifies the audio spectrum with this scaling operation.

A second approach involves selecting interstitial videos (i.e., video advertisements) to serve with the main video where the audio spectrums of the interstitial videos reflect that of the main video. That is, video advertisements are chosen at least partly based on how closely their audio spectrum compares to that of the main video. One aspect of this second approach is to weight video advertisements more heavily the closer those video advertisements are to reflecting the audio spectrum of the main video. Another aspect of this second approach is to consider for selection, only those video advertisements whose audio spectrum is within a certain range of the audio spectrum of the main video. Yet another aspect is to apply both the weighting feature of the former aspect and the threshold feature of the later aspect. Thus, the video advertisement that is served with a main video may closely compare in terms of audio parameters to the audio parameters of the main video. This second approach may work well when the inventory of available advertisers and video advertisements is large enough that applying one or both of the audio weighting and threshold features, or some other audio-based selection criteria still allows a "meaningful" video advertisement to be served—that is, the served video advertisement is relevant to the viewer's likes, interests, and/or demographics, for example. This second approach has the added advantage of not adjusting the audio spectrum of the video advertisement, which may be important to, or a requirement of, some advertisers. This second approach has the further advantage of not requiring specific audio adjusting code in the media player or browser of the viewer's media device, or at the remote media server. Finally, this second approach has the advantage that all viewers who experience the interstitial video advertisement have exactly the same viewing (and listening) experience, which may be what the advertiser desires.

Thus, the herein disclosed systems and methods overcome limitations inherent in current media content delivery systems. More specifically, the systems and methods may scale, control, or match audio levels of different content segments that are played in proximity to each other. For example, the systems and methods match the audio volume of sponsored content segments that are to be played in proximity to the media content segments. In an embodiment, advertisements, and more particularly video advertisements or advertisements that incorporate audio features, which are selected to play in proximity to a main video (or several main videos), may be chosen so that the base audio levels of the video advertisements approximate or equal the base audio level of the main video(s). In another embodiment, the base audio level of an advertisement is adjusted to more closely compare to the base audio level of the main video(s). In yet another embodiment, the audio spectrum of the advertisement is adjusted to compare closely or exactly to the audio spectrum of the main video(s). In still another embodiment, portions of the audio spectrum of the advertisements are adjusted to approximate the audio spectrum of the main video(s). In the above embodiments, this "matching" of the video advertisements to the main video(s) may be made on the basis of the audio levels of the preceding main video or the following main video, or both main videos. In the embodiments in which base audio levels or audio spectrums are adjusted, such adjustments may be made at a remote server or at the media device.

Thus, matching, as used herein, includes selection of video advertisements which have audio parameters that correspond to those of nearby videos. However, as used herein, matching also includes adjusting (usually but not always down) one or more audio parameters of the video advertisements.

While the disclosure will primarily describe audio matching in the context of video advertisements in proximity to a video, the systems and methods are not limited to this illustrative scenario and other scenarios may take advantage of the audio matching. For example, the herein disclosed systems and methods may be used to match audio between or among videos in a playlist, audio levels in radio broadcasts, and audio levels of songs selected from a media device's internal storage or from a cloud storage.

FIG. 1 illustrates an example environment in which audio parameters of media may be controlled; that is, for example, audio parameters of a sponsored content segment may be matched to audio parameters of media content segments in proximity to which the sponsored content segments may be played. Such matching may be effectuated by selection of the sponsored content segments. Alternately, such matching may be effectuated by adjustment of audio parameters of the sponsored content segments. In an embodiment, the audio parameters may include a base audio level or a portion or all of an audio spectrum of the sponsored content segment. For example, the high-end of the sponsored content segment's audio spectrum may be truncated so as to be within a specified range of the media content segment's base audio level.

In FIG. 1, environment 10 includes viewing location 20 at which viewer 22 operates one or more media devices 24, media delivery system 30, and sponsor 40. The media devices 24 at the viewing location 20, media delivery system 30, and sponsor 40 communicate over network 50.

The viewing location 20 includes first media device 24A and second media device 24B through which the viewer 22 is exposed to media from media delivery system 30 and sponsor 40. The viewing location 20 may be a residence of the viewer 22, who operates media devices 24A and 24B to access, through router 25, resources such as Web sites and to receive television programs, radio programs, and other media from the media delivery system 30. The media devices 24A and 24B may be fixed or mobile. For example, media device 24A may be an Internet connected "smart" television (ITV); a "basic" or "smart" television connected to a set top box (STB) or other Internet-enabled device; a Blu-Ray™ player; a game box; and a radio, for example. Media device 24B may be a tablet, a smart phone, a laptop computer, or a desk top computer, for example. The media devices 24A and 24B may include browsers 26A and 26B, respectively. The browsers may be software applications for retrieving, presenting, and traversing resources such as at Internet Web sites. The browsers may record certain data related to Web site visits. The media devices 24A and 24B also may include applications. The viewer 22 may cause the media devices 24A or 24B to execute applications 28A and 28B, respectively, such as a mobile banking application, to access online banking services. The application may involve use of a browser or other means, including cellular means, to connect to the online banking services. Other aspects and features of the media devices 24A and 24B are illustrated and described with respect to FIG. 3.

When visiting a Web site, the viewer 22 may register with and log on to the Web site by providing a visitor-created identification (hereafter, a user ID) and a password and/or pass code, for example. Alternately, the viewer 22 may access the Web site without registering and without logging on. Whether or not logged on, the viewer 22 may take actions that may be recorded as visitor actions at the Web site such as clicking on a link, filling a shopping cart, downloading content, uploading content, purchasing a product or service, or filling out a form, for example.

When using an application, the viewer 22 may make various selections that also may be recorded and analyzed. For example, the viewer 22 may select a pop-up or overlay advertisement presented during execution of the application.

The browsers 26A and 26B may include computer code to store files 27A and 27B, respectively, and record viewer actions. The browsers may store information related to Web site visits, including a url of the Web site, date and time of visit, length of visit (or start and stop time of visit), and actions taken by the viewer 22 during the visit. The browsers may store information that unambiguously identifies the viewer 22. However, the browsers may do so without storing any personally-identifiable information regarding the viewer 22. Similarly, the applications may store visitor identification information, Internet address information, and other data and information related to use of the applications.

In situations in which the systems disclosed herein may collect personal information about viewers, or may make use of personal information, the viewers may be provided with an opportunity to control whether programs or features collect viewer information (e.g., information about a viewer's social network, social actions or activities, profession, a viewer's preferences, or a viewer's current location), or to control whether and/or how to receive advertisements from an ad server that may be more relevant or of interest to the viewer. In addition, certain data may be treated in one or more ways before it is stored or used, so that personally identifiable information is removed. For example, a viewer's identity may be treated so that no personally identifiable information can be determined for the viewer, or a viewer's geographic location may be generalized where location information is obtained (such as to a city, ZIP code, or state level), so that a particular location of a viewer cannot be determined. Thus, the viewer 22 may have control over how information is collected about the viewer and used by a server.

The media delivery system 30 provides media content to the viewing location 20 via the network 50. The example media delivery system 30 may provide any combination of video, audio, text, images, or any other type of media content. Thus, for example, the media delivery system 30 may provide television programming, movies, radio, Internet content, and/or any other type of media content. In an embodiment, the media delivery system 30 provides media content segments 36 for display on the media devices 24A and 24B. In this embodiment, the media delivery system 30 may be an Internet-based system and may include Web server 31 that operates to provide Web sites 32. The Web sites 32 may include an Internet search Web site; a social network Web site; a commercial Web site selling products and services, and providing information about the products and services; an online service such as an online banking service or an online dating service; and a Web site operated by a government agency. Each Web site 32 may have a number of Web pages 33.

In an embodiment, the media content segments 36 are video programs, or simply videos. The videos may be created by a separate entity (not shown) and may then be provided to the media delivery system 30. For example, the videos may be created by a movie producer, a television program producer, or an individual such as the viewer 22. The videos may be stored on the server 31. Alternately, only a link or reference to the videos is stored on the server 31, and the videos are retrieved from a separate database or file (not shown) and provided to the media devices 24A and 24B based on the link or reference. In an example, the link or reference is a url. In a further example, one or more of the Web pages 33 may include a link or reference to a Web site, external to the media delivery system 30, at which a video is located.

In another embodiment, the media delivery system 30 may be a television program provider such as a cable television company, a radio program broadcaster, or any other system capable of delivering media content segments and/or sponsored content segments to the media devices 24A and 24B over communications network 50.

The sponsor 40 may be a commercial or government entity, for example. The sponsor may create and provide, using server 41, sponsored content segments 46 to be served on the media devices 24A and 24B. The sponsored content segments 46 may be served directly from the sponsor 40 to the media devices 24A and 24B, or may be provided to the media delivery system 30, which then may serve the sponsored content segments 46 to the media devices 24A and 24B.

The network 50 may be any communications network that allows the transmission of signals, media, messages, voice, and data to the media devices 24A and 24B, over communications path 52, from another media device, computer, or server, such as servers 31 and 41, including radio, linear broadcast (over-the-air, cable, and satellite) television, on-demand channels, over-the-top media, including streaming video, movies, video clips, and games, and text, email, and still images, and transmission of signals, media, messages, voice, and data from the media devices 24A and 24B to another media device, computer, or server. The network 50 includes the Internet, cellular systems, satellite systems, and other current and future mechanisms for transmission of these and other media. The network 50 may be both wired and wireless.

The media devices 24A and 24B, the media delivery system 30, and/or the sponsor 40 may include a system (see FIGS. 3 and 4) for matching the audio of sponsored content segments 46 to that of nearby media content segments 36. In one embodiment, the media devices 24A and 24B include a system that detects or processes the audio levels of displayed videos and either adjusts the audio levels of video advertisements served in proximity to the displayed videos, or sends a signal to, for example, the media delivery system 30, calling for a video advertisement whose audio level matches that of the nearby videos. In an embodiment, the viewer 22 may enable or disable such audio matching by operation of the media devices 24A and 24B.

In another embodiment, an audio matching system included with server 31 either calls for video advertisements whose audio level matches that of nearby videos, or adjusts the audio levels of video advertisements that will be served in proximity to videos being displayed at the media devices 24A and 24B. In yet another embodiment, the sponsor 40 incorporates aspects of an audio matching system. In one aspect of these later two embodiments, a decision to match (through advertisement selection or audio adjustment) audio levels between video advertisements and videos is based on a request from the viewer 22. In another aspect, the match decision is based on learned behavior of the viewer 22 (e.g., the viewer mutes video advertisements whose audio levels are excessive). In yet another aspect, the match decision is based on learned behavior of a group of similarly-placed viewers. These and other aspects of the audio matching systems are discussed with respect to FIGS. 3 and 4.

Figure 2A:
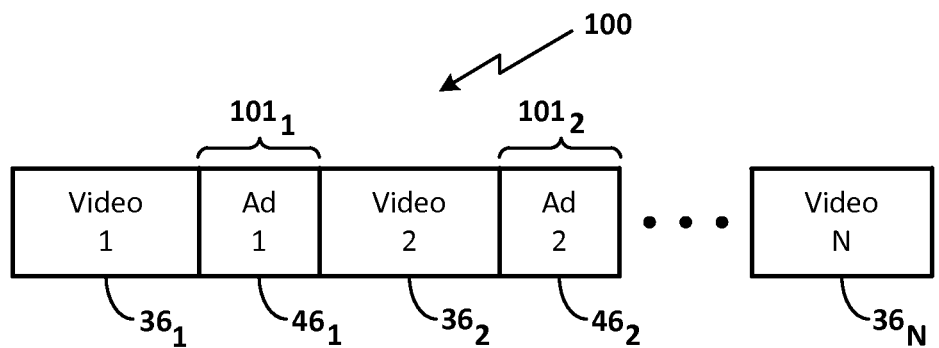
FIGS. 2A and 2B illustrate examples of ways in which sponsored media content segments, or advertisements, may be placed or served in proximity to media content segments such as videos.
Figure 2B:
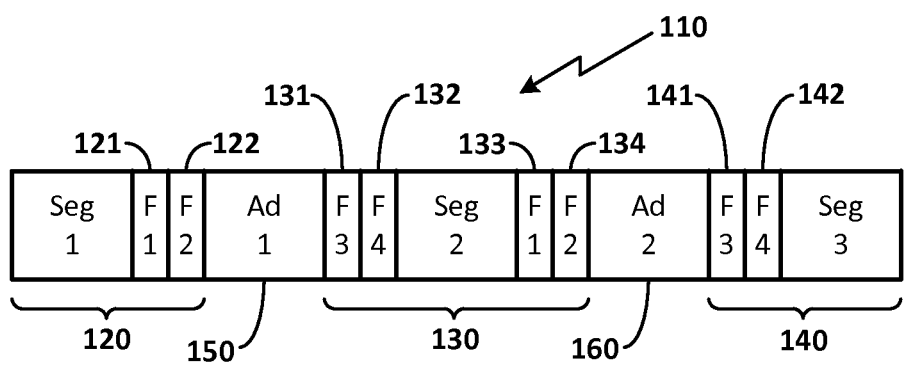

FIGS. 2A and 2B illustrate examples of ways in which sponsored media content segments such as video advertisements may be placed or served in proximity to media content segments such as videos. Many other example arrangements of advertisements and videos are possible. The herein disclosed systems and methods may be used to match audio of the video advertisements to that of the videos.

FIG. 2A illustrates an example playlist of media content segments with corresponding interstitial spaces in which sponsored content segments may be served. In the embodiment illustrated in FIG. 2A, the media content segments are videos and the sponsored content segments are advertisements such as video advertisements. Both the videos and the video advertisements include audio components.

The videos may be listed in a video playlist. The playlist may include favorite videos that the viewer 22 has collected and may watch periodically. The playlist may be stored at the media device 24A and includes links to specific videos, which are accessed by activating or following the links (i.e., urls) to the appropriate Web page. Furthermore, the playlist may be identified by a given name or identification as belonging to the viewer 22, and the playlist contents may be stored away from the media player 24A, for example in a cloud storage or at a Web page.

In FIG. 2A, playlist 100 includes videos 36n. As referred to earlier, the videos 36n are "main" videos. The videos 36n may be related to a common theme such as classical music, rock music, or sports shows, for example. Alternately, the playlist 100 may include eclectic videos. In proximity to at least some of the videos 36n are advertisement spots 101i. Advertisements 46n are shown placed in advertisement spots 101n. In the illustrated example, an advertisement spot 101i and a corresponding advertisement 46i follows each of the videos 361-(N-1). However, each video 36i need not be followed or preceded by an advertisement spot 101i and a corresponding advertisement 46i. For example, an advertisement spot 101i and a corresponding advertisement 46i may be placed between specific videos 36i; between videos of a specific artist, artist, theme, subject, or genre; only during specific times, and in specific locations (i.e., the advertisement spots 101i do not appear in the same location in every play of the playlist 100). Furthermore, the playlist 100 may allow shuffling, which may affect the placement of advertisement spots 101i. Finally, for example, an advertisement spot 101i and a corresponding advertisement 46i need not be interspersed between each pair of videos 36i, at least some videos 36i are preceded or followed by an advertisement 46i.

In an embodiment, one or more of the advertisements 46n are video advertisements that include an audio component or otherwise have audio features. Alternately, one or more of the advertisements 46n may be rich media advertisements or animated advertisements that include audio components or audio features.

In the example of FIG. 2A, the advertisements and the videos may be created with the same or with different base audio levels and the same or different audio spectrums. For example, video 361 may have a base audio level of 70 dB and an audio spectrum ranging from a low of 64 dB to a high of 76 dB; and advertisement 461 may have a base audio level of 76 dB and a range of 70 to 82 db. In this example, when video 361 ends and advertisement 461 begins, the viewer 22 may experience a sharp increase or jump in audio level of volume (in this example, as much as 6 dB in base audio level) from media device 24A.

In one aspect of the playlist 100, the selected videos 36i are saved at a remote server such as the server 31. When the viewer 22 selects playlist 100 to play on media device 24A, the server 31 begins the process of matching video advertisements 46i to videos 36i.

FIG. 2B illustrates an alternate arrangement of advertisements in proximity to videos. In FIG. 2B, video program 110 includes three video segments 120, 130, and 140, which together constitute a distinct video (i.e., a main video). The total length of the video may be 54 minutes, for example. Interspersed between the video segments 120, 130, and 140 are video advertisements 150 and 160. The video segments and video advertisements may include audio components. However, either or both the base audio levels and the audio spectrum of the video segments and the video advertisements may differ, and differ significantly, to the point where a viewer 22 listening to the audio would be annoyed and may manually adjust (including by muting) the audio levels during the time the video advertisements are displayed.

More specifically, each of the video segments 120, 130, and 140 may include a number of frames F, and when these frames F are played on the media devices 24A or 24B, the audio levels may vary from frame to frame. For example, video segment 120 includes, at the end of the video segment, frames 121 and 122. The audio associated with these frames 121 and 122 may differ, and may differ from frames (not shown) preceding them in the video segment 120. Nonetheless, the audio levels in the frames 121 and 122 (and indeed in the entire video segment 120) may have a base level and may be constrained by an upper audio level and a lower audio level that define an audio spectrum for the frames 121, 122 and the entire video segment 120. Video advertisement 150 may have a base audio level and an audio spectrum that is the same as or different from those of the video segment 120. In an example, the base audio level and the upper audio level of the video advertisement 150 are twice as high as those of the video segment 120. The sharp increase or jump in audio level when the video segment 120 ends and the video advertisement 150 begins may cause discomfort to or annoy the viewer 22. In response, the viewer 22 may mute the video advertisement, thereby eviscerating the effect of the video advertisement 150.

Similarly, the base audio level and upper audio level of the advertisement 150 may be significantly higher than the base audio level and upper audio level of frames 131 and 124 (i.e., the first two frames) of video segment 130, and the base audio level and upper audio level of the advertisement 160 may be significantly higher than the base audio level and upper audio level of frames 133 and 134 (i.e., the last two frames) of video segment 130 and significantly higher than frames 141 and 142 (i.e., the first two frames) of video segment 140.

To address the above-described problem of sharply-differing audio levels, the herein disclosed systems and methods may attempt to match audio levels between and among the video segments and the video advertisements. In one embodiment, the matching occurs between the audio levels (e.g., base audio level and/or audio spectrum) of the last few frames of a video segment and those of the succeeding video advertisement. In another embodiment, the matching occurs between the base audio level and/or audio spectrum of the entire video segment and the succeeding video advertisement. In yet another embodiment, the matching occurs between the base audio level and/or the audio spectrum of the video advertisement and the succeeding video spectrum. In still another embodiment, the matching occurs between the base audio level and audio spectrum of the video advertisement and those of both the preceding and succeeding video segments.

Furthermore, the audio matching may relate to selecting a video advertisement that has base audio and audio spectrum levels that are compatible (e.g., within a defined decibel range) of those of either or both of the preceding and succeeding video segments. Alternately, the audio matching may involve reducing the base audio level and/or the upper audio level of the video advertisement relative to those of either or both the preceding or succeeding video segments. In one aspect, the audio level reductions may involve a prompt, sustained reduction in audio levels of the video advertisement. In another aspect, the initial audio levels of the video advertisement may be reduced to better match that of the preceding video segment, and then may be allowed to ramp up to the originally-designed audio levels. In still another aspect, the audio levels of the video advertisement may be ramped down to match that of the succeeding video segment. As noted above, this audio matching may be based on the entire video segment(s) or a few frames (starting or ending) of the video segment(s).

Rather than considering the audio levels of video segment frames, the audio matching may be performed based on a time block of the video segment, such as the last minute of a video segment (preceding) or the first minute of a video segment (succeeding).

Figure 3:
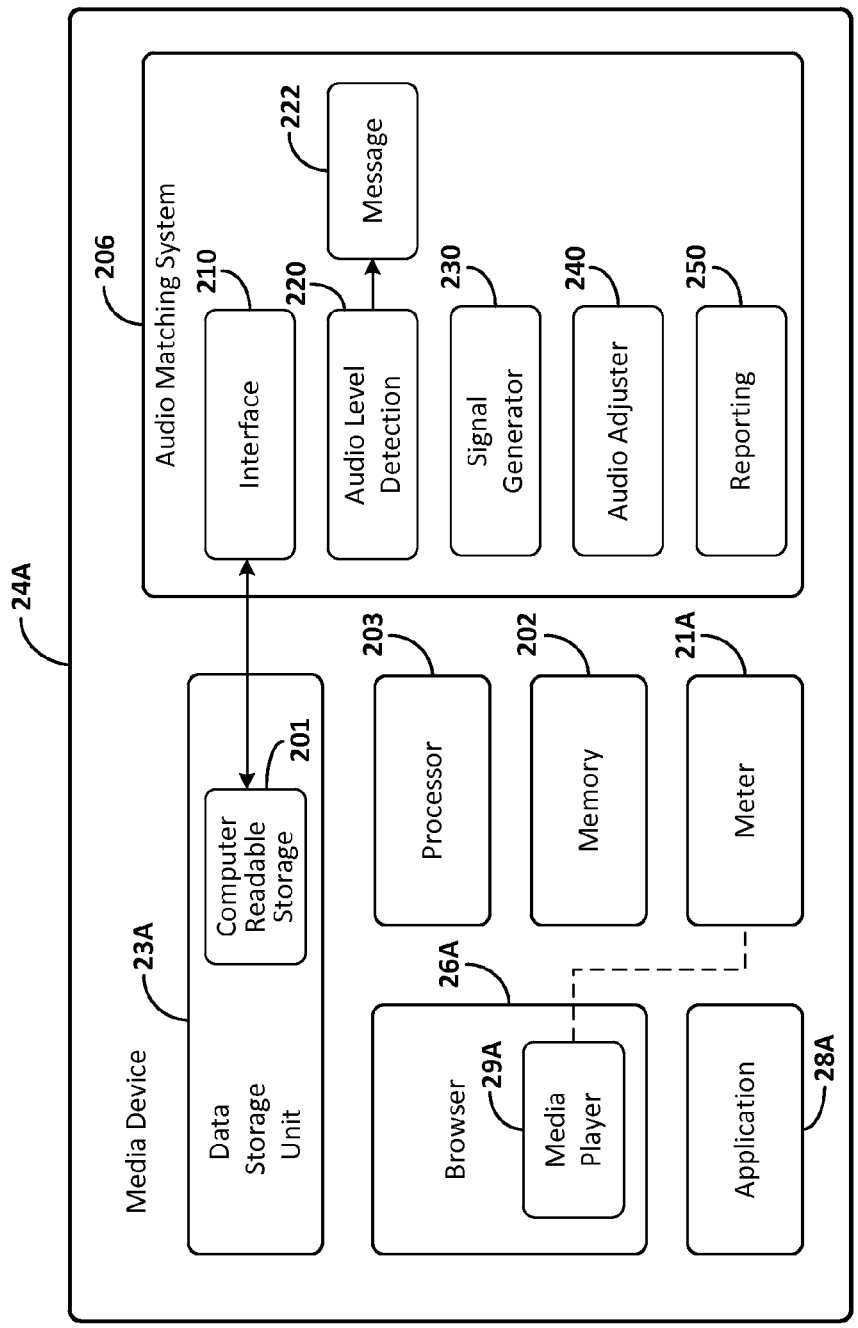
FIG. 3 illustrates an example system in which audio levels of media content and sponsored content segments may be controlled.
Figure 4:
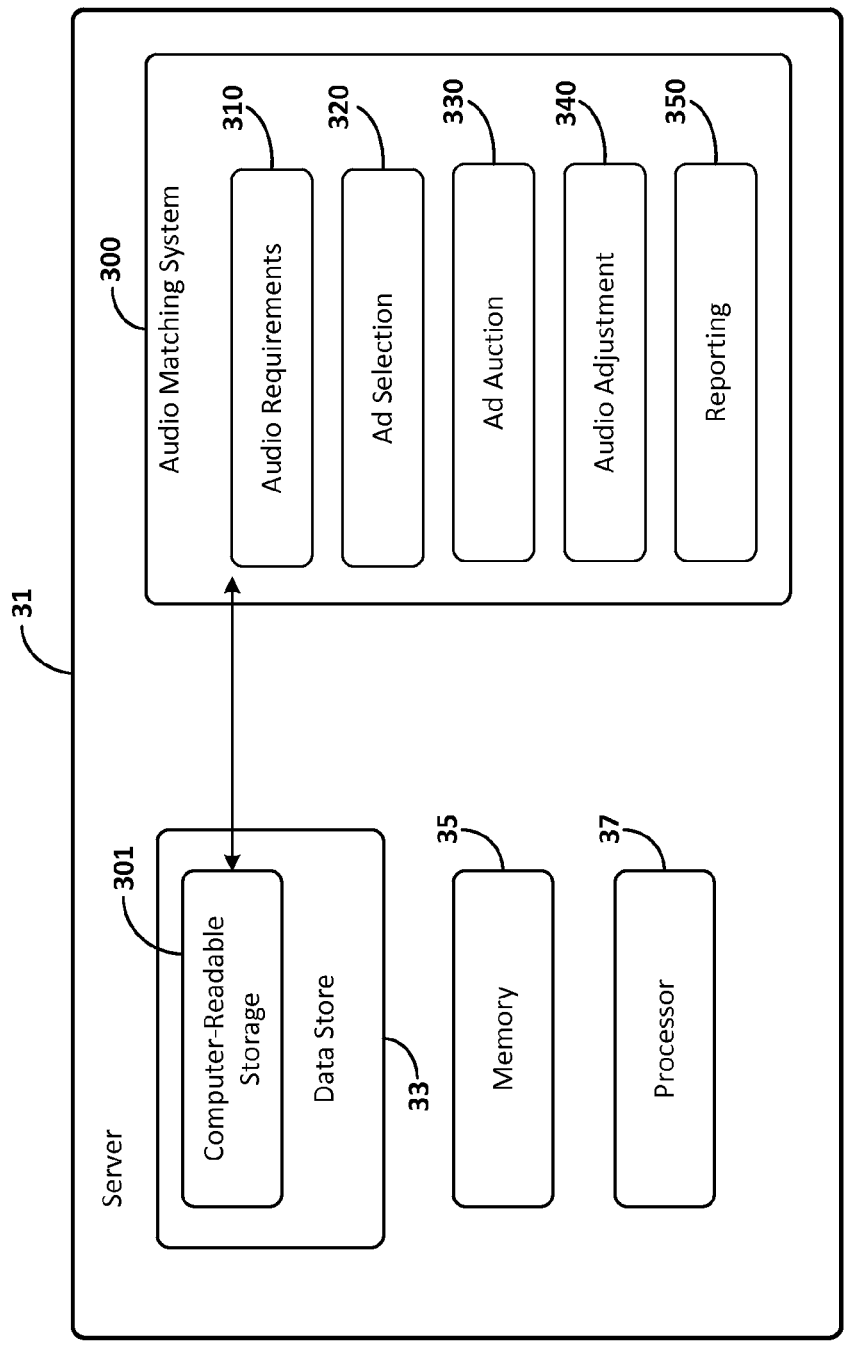
FIG. 4 illustrates another example system in which audio levels of media content and sponsored content segments may be controlled.

FIGS. 3 and 4 illustrate example systems that may be used for audio scaling, controlling, and matching. As noted above, audio matching may involve selecting video advertisements whose base audio and/or audio spectrum are the same as, or similar to those of nearby videos or video segments. Alternately, the audio matching may involve truncating or reducing the maximum audio level or base audio level of the video advertisement. The system that implements audio matching may be placed entirely on a media device such as the media device 24A, entirely on a remote server such as the server 31, or on a combination of the media device and the remote server. Furthermore, the audio matching system components may be split between or among multiple remote servers, such as between the server 31 and the server 41. In one aspect, the method for audio matching dictates to a degree the placement of audio matching system components between the media device and the remote server. In another aspect, such placement is purely arbitrary. Furthermore, some sponsors or advertisers may not permit modification to the audio of their video advertisements. This requirement may further dictate the placement of audio matching system components. These and other aspects and features of the audio matching systems are described below.

FIG. 3 illustrates an example media device-level system in which audio levels of media content and sponsored content segments may be matched. FIG. 3 describes the system considering its implementation on media device 24A of FIG. 1, with videos supplied and video advertisements served by server 31. However, the system may alternately, receive video advertisements directly from the sponsor 40.

In FIG. 3, media device 24A includes data storage unit 23A, the browser 26A, the application 28A, media player 29A, and audio matching system 200. Audio matching system 200, which is described below, includes viewer selection module 210, audio level detection module 220, signal generator module 230, audio adjustor module 240, and reporting module 250. The audio matching system 200 may be installed as a program of instructions into a non-transitory computer-readable storage medium 201. The computer readable storage medium 201 may be implemented as a part of a data storage unit 23A of the media device 24A. The program of instructions may be read into memory 202 and executed by processor 203. The processor 203 may be a hardware component of the media device 24A. In an embodiment, the system 200 is included as a component of the browser 26A. In an aspect, the system 200 is included with installation of the browser 26A in the media device 24A. In another aspect, the system 200 is "pushed" to the media device 24A from, for example, the server 31, and may be a plug-in to the browser 26A. In another embodiment, the system 200 is updated periodically or a-periodically by updates pushed from the server 31 to the media device 24A. The system 200 may be executed in cooperation with the browser 26A and the media player 29A.

The system 200 also may be executed in cooperation with browser 26A and application 28A.

In an embodiment, the media delivery system 30 of FIG. 1 provides the media player 29A to the media device 24A for presenting media content. To illustrate provision of the media player 29A, in FIG. 1 the media player 29A is shown at the system 30, the viewing location 20, and in transit between the system 30 and the viewing location 20. The media player 29A may be a video player capable of presenting audio and/or video content. The media player 29A may additionally or alternatively present any type of media content. The media player 29A may be implemented in any manner. For example, the media player 29A may be implemented in Adobe™ Flash™ (e.g., provided in a SWF file), in hypertext markup language (HTML) (e.g., HTML version 5 (HTML5), or in Google Chromium™. The media player 29A may be implemented according to the Open Source Media Framework (OSMF), according to a device or operating system provider's media player application programming interface (API), or on a device or operating system provider's media player framework (e.g., the Apple™ iOS™ MPMoviePlayer software).

In the illustrated example of FIGS. 1 and 3, the media player 29A executes in an execution environment (e.g., Google Native Client environment, Netscape Plug-in Application Programming Interface (NPAPI), etc.) in browser 26A. Alternatively, the media player 29A may execute directly on the media device 24A (e.g., the Adobe™ Flash™ execution environment, in the Google Chromium™ execution environment, the Apple™ iOS™ environment, the Google Android™ environment, and the Hewlett Packard webOS environment, for example), may execute directly in the browser 26A without the use of an execution environment, or may execute in an execution environment in association with the browser 26A. In an example, the media player 29A is a media player that is not executed in a Web browser.

In an embodiment, the media player 29A is transmitted to the media device 24A after the media device 24A requests media content from the system 30. For example, the media player 29A may be transmitted to the media device 29A in response to a first or initial request for presentation of media content by the media player 29A (i.e., when the media device 24A does not already have the media player 29A stored (e.g., in a storage cache, repository, such as in the browser 26A). Alternatively, the media player 29A may be transmitted to the media device 24A each time media content is requested (i.e., regardless of whether or not the media device 24A already stores the media player 29A). In another embodiment, the media player 29A is transmitted at a time not associated with a request for media content from the media device 24A. For example, the media delivery system 30 may push the media player 29A to the media device 24A with another product, may transmit the media player 29A in response to a request by the media device 24A for the media player 29A, and/or upon the media device 24A or the viewer 22 signing up for some service and/or group (e.g., joining an audience measurement panel run by, for example, an audience measurement entity). For example, the media device 24A may request that the media player 29A be transmitted so that the media device 24A is prepared to receive and present media content (e.g., videos) at a later time. In an embodiment, after the media player 29A has been sent to the media device 24A, the media device 24A may store the media player 29A for later access (e.g., after the media player 29A has been terminated and/or after a browser 26A or application 28A has been terminated) and, thus, the media device 24A will not receive the media player 29A in a subsequent transaction with the media delivery system 30.

The media player 29A obtains media content to be presented from the media delivery system 30 that provided the media player 29A and/or from other media content providers. For example, when the media device 24A requests presentation of a particular video, the media player 29A and/or the browser 26A requests the particular video from the corresponding media delivery system. For example, the media player 29A may instruct the browser 26A to request the video. When the requested video is received from the system 30, the media player 29A presents the video at the media device 24A. The media player 29A may include controls for allowing the viewer 22 to control the presentation of the media content (e.g., pause, play, fast-forward, rewind, volume up or down, mute, etc.).

The media player 29A may include a meter 21A. alternately, the meter 21A may be installed apart from the media player 29A. The meter 21A notes the played audio level of interstitial content segments (e.g., video advertisements) when the system 200 operates to truncate the audio spectrum or lower the base audio level of the video advertisement. The meter 21A may present this data back to the media delivery system 30.

Turning to the audio matching system 200, the viewer selection module is optional and may allow the viewer 22 to implement audio matching features of the system 200. For example, the viewer 22 may be able to turn on and off the audio matching features provided by the system 200. This selection may be provided to the viewer 22 through use of an on-screen interface, such as a dialog box, pull-down menu, or similar device. Selection of audio matching may be a default setting. Alternately, selection of audio matching may be confirmed each time the viewer 22 elects to view video programs that contain video advertising slots such as those shown in FIG. 2B. When the viewer 22 elects audio matching, the system 200 then may operate in an automatic mode to apply audio matching as disclosed herein.

The audio level detection module 220 may detect the base audio level of a displayed video to determine if audio matching to possible video advertisements is required. For example, a video may have a base audio level of 70 dB, and an audio spectrum of 67-73 dB. These audio values may be stored by the server 31 and provided as metadata related to the video when the viewer 22 requests display of the video (e.g., the viewer 22 clicks on a link to the video or instructs the video player 29A to play the video, such as the video 110 of FIG. 2B or to access a video playlist, such as the playlist 100 of FIG. 2A). Thus, when the viewer 22 has elected audio matching and the base audio of the video to be displayed is 70 dB, the module 220 may output message 222 indicating that any served video advertisements must have a base audio that matches the video's base audio level of 70 dB.

The signal generator module 230 generates a base audio signal and an audio profile, as needed, for the videos and the video advertisements. The signals may be generated on-the-fly, that is, while the videos and video advertisements are playing, respectively.

As installed in the media device 24A, the system 200 may effectuate audio matching by one of at least two mechanisms. In a first mechanism, audio matching entails messaging an external server, such as the server 31, that audio matching is requested by the viewer 22. With this mechanism, the server 31 then executes the requested audio matching. The server 31 may select for consideration to be served with the video, only those video advertisements with the same or similar audio levels as the video program being displayed. Alternately, the server 31 may reduce the base audio level of the video advertisement to more closely agree with that of the video, and/or may truncate the upper audio level of the video advertisement. The sever 31 then serves a video advertisement whose audio levels are the same as, or close to those of the video. Thus, signal generator module 230 may send a message to server 31 requesting audio matching of video advertisements that may be served during or in proximity to play of the video.

In a second mechanism, audio adjustment module 240 reduces the base level of any received video advertisements, and/or truncates the high level audio of the video advertisements so as to be the same or similar to those of the displayed video. However, with this mechanism, the server 31 may have been notified of the desire to match audio levels, and in response, the server 31 only serves audio advertisements for which the sponsor has not designated audio as impermissible.

The audio adjustment mechanism of the module 240 may execute to override the normal volume controls of the media device 24A. Alternately, the mechanism when executed modify the internal volume control signal of the media device 24A so that the audio level output of the media device 24A is within a specified amount of the viewer's requested base audio level, with no audio levels outside the bounds of a corresponding audio spectrum.

The reporting module 250 optionally reports to the server 31 when the audio adjustment module 240 has reduced the base audio level and/or the high audio level of a video advertisement. The reporting module 250 also, optionally, may receive an actual played audio signal (loud to quiet, mute) from the media player 29A and report the data to the media delivery system 30.

FIG. 4 illustrates another example system that may be used to scale, control, or match audio levels of sponsored content segments relative to audio levels of media content. FIG. 4 describes a system considering its implementation on server 31 of FIG. 1. However, components of the system may be implemented on server 41.

In FIG. 4, audio matching system 300 includes audio requirements module 310, advertisement selection module 320, advertisement auction module 330, audio adjustment module 340, and reporting module 350. The audio matching system 300 may be installed as a program of instructions into a non-transitory computer-readable storage medium 301. The computer readable storage medium may be implemented as a part of a data storage unit 33 of the server 31. The program of instructions may be read into memory 35 and executed by processor 37. The processor 37 may be a hardware component of the server 31.

The audio requirements module 310 may receive an input from media device 24A indicating the viewer 22 desires audio matching between or among videos to be displayed at the media device 24A and video advertisements to be served in proximity to the displayed videos. The viewer's input may be a one-time input, which the viewer subsequently may change. In this event, the system 300 may perform audio matching until requested otherwise by the viewer 22.

In a first aspect, the advertisement selection module 320 operates to select only video advertisements whose base audio and possibly audio spectrum are the same as or closely approximate those of nearby videos. The selected video advertisements then may be processed through an auction system to select a video advertisement to serve with the video. In a second aspect, the advertisement selection module 320 provides a weighting factor to video advertisements whose base audio and possibly audio spectrum are the same as or closely approximate those of nearby videos. The weighting factor increases the likelihood that the weighted video advertisement will be selected in the auction process. In third aspect, the advertisement selection module 320 selects only those video advertisements whose creator or owner (e.g., the sponsor) has consented to audio matching. The thus-selected video advertisements are processed through the auction system to determine which video advertisement to serve with a video.

Video advertisements selected according to the first and second aspects do not experience reduction of base audio level or truncation of high level audio. Video advertisements selected according to the third aspect have their base audio and possibly high level audio adjusted by the system 300. Alternately, video advertisements chosen according to the third aspect have their base audio and possibly high level audio adjusted by the system 200 (see FIG. 3) or another entity.

The advertisement auction module 330 selects, from a pool of candidate video advertisements selected by the first or second aspect of the module 320, a video advertisement to serve with a video using any one of a number of auction methods.

If the second aspect of the module 320 is followed, the audio adjustment module 340 adjusts (e.g., generally decreases) the base audio level and possibly truncates the audio spectrum of the video advertisement selected by the auction module 330. Alternately, such audio matching is performed in the media device 24A.

The reporting module 350 optionally sends a report to the sponsor 40 whenever the system 300 performs audio matching for a video advertisement that is served with a video. The reporting module 350 also, optionally, may report to the appropriate sponsor, such as sponsor 40, all audio matching, including audio matching for video advertisements that the auction module 330 does not select. This sponsor feedback allows the sponsor to consider changing the audio of its video advertisements.

Besides the example systems illustrated in FIGS. 3 and 4, audio matching between and among videos and video advertisements (or between or among any other types of media, including multiple videos, rich media, applications, radio, television (streaming and broadcast)) may be implemented between a client (e.g., the media device 24A) and a server (e.g., the server 31) using many different combination of modules and devices illustrated in FIGS. 3 and 4 and described above.

FIGS. 5-10B are flowcharts illustrating example audio matching methods. The flowcharts are based on the example environment of FIG. 1, the example media arrangements of FIGS. 2A and 2B, and the example systems of FIGS. 3 and 4.

Figure 5:
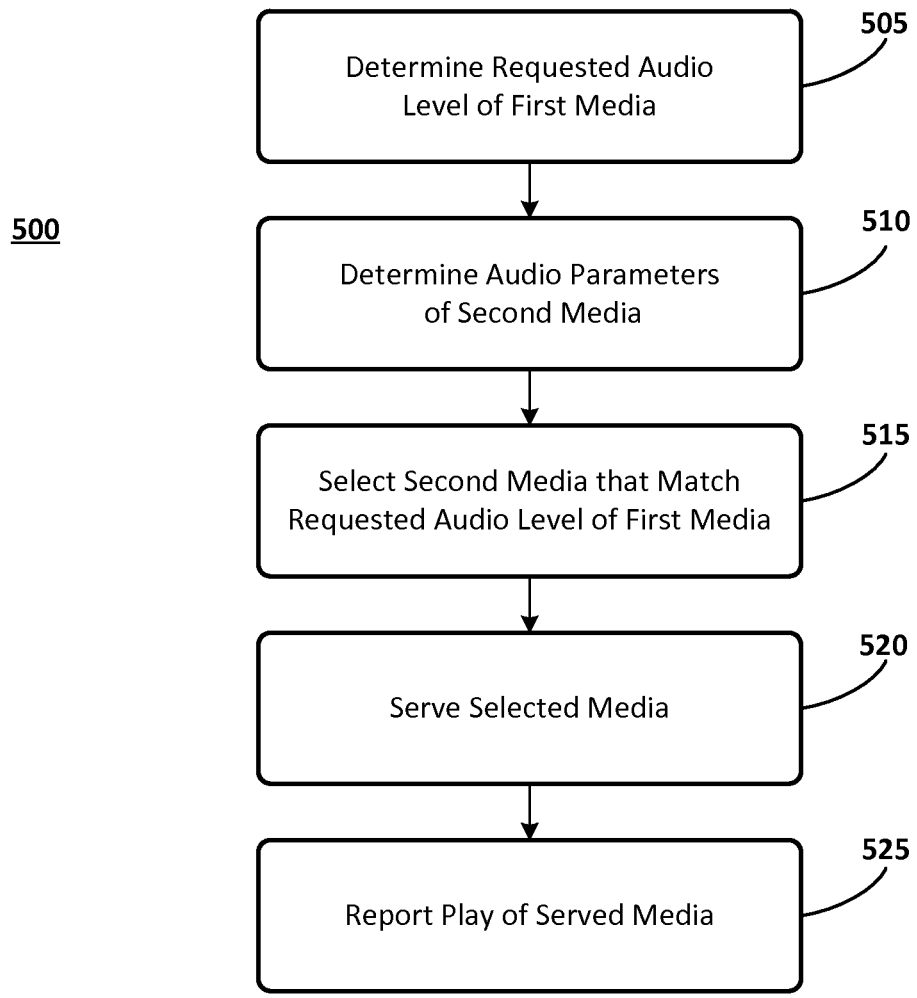
FIGS. 5-10B are flowcharts illustrating example methods for controlling audio levels of media content and sponsored content segments.

FIG. 5 illustrates audio matching method 500. Method 500 begins in block 505 when an audio matching system determines requested audio level parameters of first media. In this block 505, the first media may be videos (i.e., as referred to herein, main videos) that form a viewer's video playlist, such as the playlist 100. In an example, the main videos are music videos for a compilation of artists. The artist compilation may be for a single artist or for multiple artists. The playlist 100 may be stored on or referenced by the server 31. The requested audio level parameters my include a desired base audio level and an audio spectrum at which the viewer 22 prefers to listen to audio associated with each of the main videos. The audio matching system may determine the requested audio level parameters by a variety of mechanisms including by receiving a direct request from the viewer 22 and learning the requested audio levels by receiving an audio level played signal from the media device 24A (e.g., from media player 29A and its meter 21A). For example, the system may learn that when playlist 100 is played at the media device 24A, the base audio level (on, for example, a scale of 0-9) always is played between 4 and 6. Note that audio level played data may be cached temporarily (e.g., in file 27A) and subsequently may be sent to the server 31 whether or not the audio matching system executes on the server 31, on the media device 24A, or on both.

In block 510, the system determines audio level parameters of second media, in the example, audio level parameters of video advertisements. For example, there may be several candidate video advertisements to serve at the media device 24A when the playlist 100 is played. The candidate advertisements may have base audio levels that range (again on a scale of 0-9) from 4-9. The system may determine these base audio levels by a learning algorithm that notes base audio levels when the video advertisements play. Alternately, the base audio levels may be included as metadata associated with each of the video advertisements. Finally, the system may determine, in block 510, if a sponsor will allow adjustment or scaling of the audio parameters associated with a specific video advertisement.

In block 515, the system selects video advertisement(s) that match audio level parameters of the main video. In block 520, the system then makes selected video advertisement(s) available for display at the media device 24A. In block 525, the media device 24A reports the play of the served video advertisement(s), including the played audio parameters (e.g., the viewer 22 may have muted the video advertisement, despite the actions of the system to match audio levels of the video advertisement to that of the main video). The method 500 then ends.

Figure 6A:
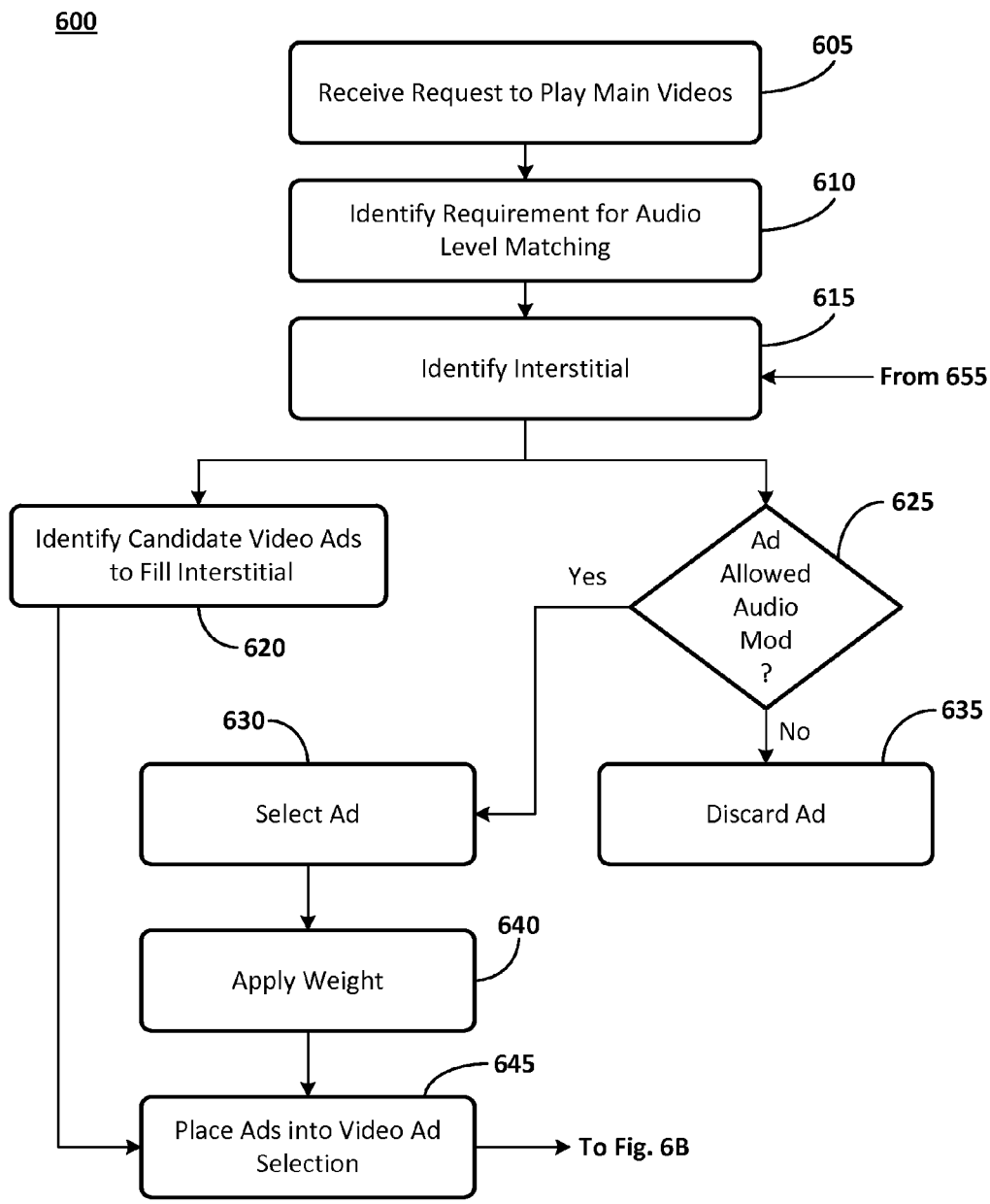
Figure 6B:
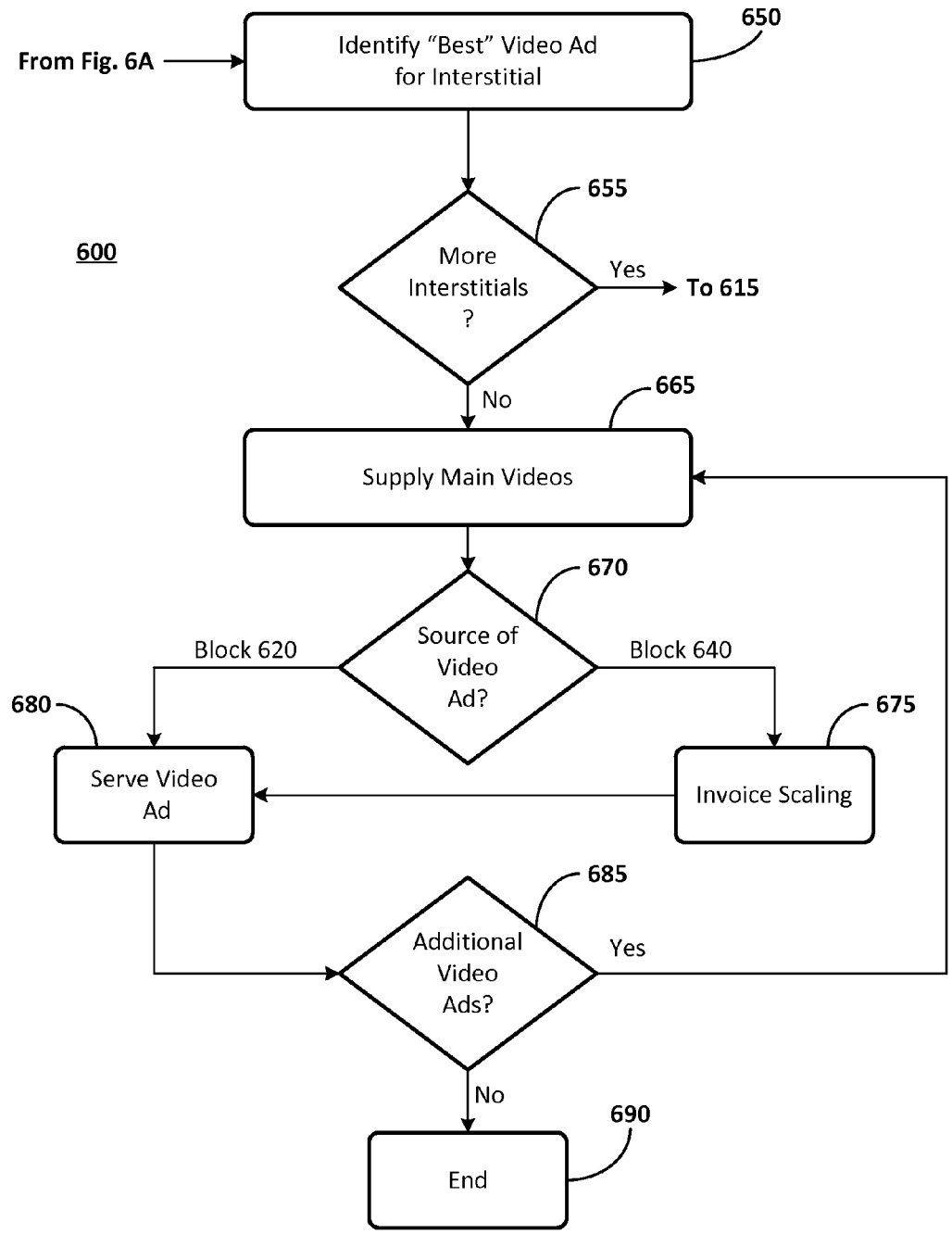

FIGS. 6A and 6B are flowcharts illustrating example audio matching method 600 as executed on server 31 of FIG. 1. The example audio matching method 600 is described with respect to playing main videos from a video playlist. Method 600 begins in block 605 when the server 31 receives a request to play main videos from playlist 100 (see FIG. 2A). In block 610, the system 300 identifies the playlist 100 as requiring audio matching between or among main videos and video advertisements, and determines the requested audio parameters. In block 615, the system 300 identifies a first interstitial in the playlist 100 in which video advertisements may be served. In block 620, the system 300 identifies candidate video advertisements whose audio parameters match or are close to that requested by the viewer 22 for the main videos. Simultaneously, in block 625, the system 300 determines if any video advertisements are allowed to have their audio parameters modified, changed, or scaled to match those of the main videos when the main videos from playlist 100 are displayed on the media device 100. In block 630, the system 300 selects those video advertisements whose sponsors allow audio modification. In block 635, the system discards from consideration, video advertisements for which audio modification is not permitted.

In block 640, the system 300 applies a weighting factor to each of the video advertisements selected in blocks 620 and remaining after block 635. In an embodiment, the system 300 applies to each of the non-discarded (block 635) candidate interstitial videos whose audio parameters require modification to match those of the first main video and a second weighting factor to each of the non-discarded candidate interstitial videos whose audio parameters do not require modification (block 620) to match those of the first main video. In an embodiment, the second weighting factor is larger than the first weighting factor, which shows a preference for not having to modify the audio parameters of a video advertisement when serving that video advertisement at a media device such as the media device 24A.

In block 645, the system 300 places the video advertisements resulting after the process of block 640 into a video advertisement selection process. In an embodiment, the video advertisement selection process is an auction process. In block 650, the system 300 identifies the "best" video advertisement for an interstitial in the playlist 100. In block 655, the system determines additional interstitials are available for serving video advertisements. If no more interstitials are available, the method 600 moves to block 665. Otherwise, the method 600 returns to block 615.

In block 665, begins supplying the main videos of the playlist 100 and the selected advertisements to the media device 24A. In block 670, the system determines if a video advertisement that is to be served results from the process of block 620 (i.e., the video advertisement's audio parameters match those of the main videos) or from the process of block 640 (i.e., the video advertisement's audio parameters require scaling or adjustment). If a video advertisement's audio requires scaling or adjustment, the method 600 moves to block 675, and the system invokes an audio scaling or adjustment process. In an embodiment, the audio scaling or adjustment process involves passing the audio through a filter (not shown). In another embodiment, the system 300 appends an instruction to the video advertisement that directs media player 29A to play the video advertisement at the required base audio level, and to limit high level audio according to a specified audio spectrum. Following either block 670 (no adjustment) or block 675, the video advertisement is served to the media device 24A. The method 600 then determines, in block 685, if any additional video advertisements are to be served. If additional video advertisements are to be served (e.g., the viewer 22 does not stop the media player 29A), the method returns to block 665. Otherwise, the method moves to block 690 and ends.

Figure 7A:
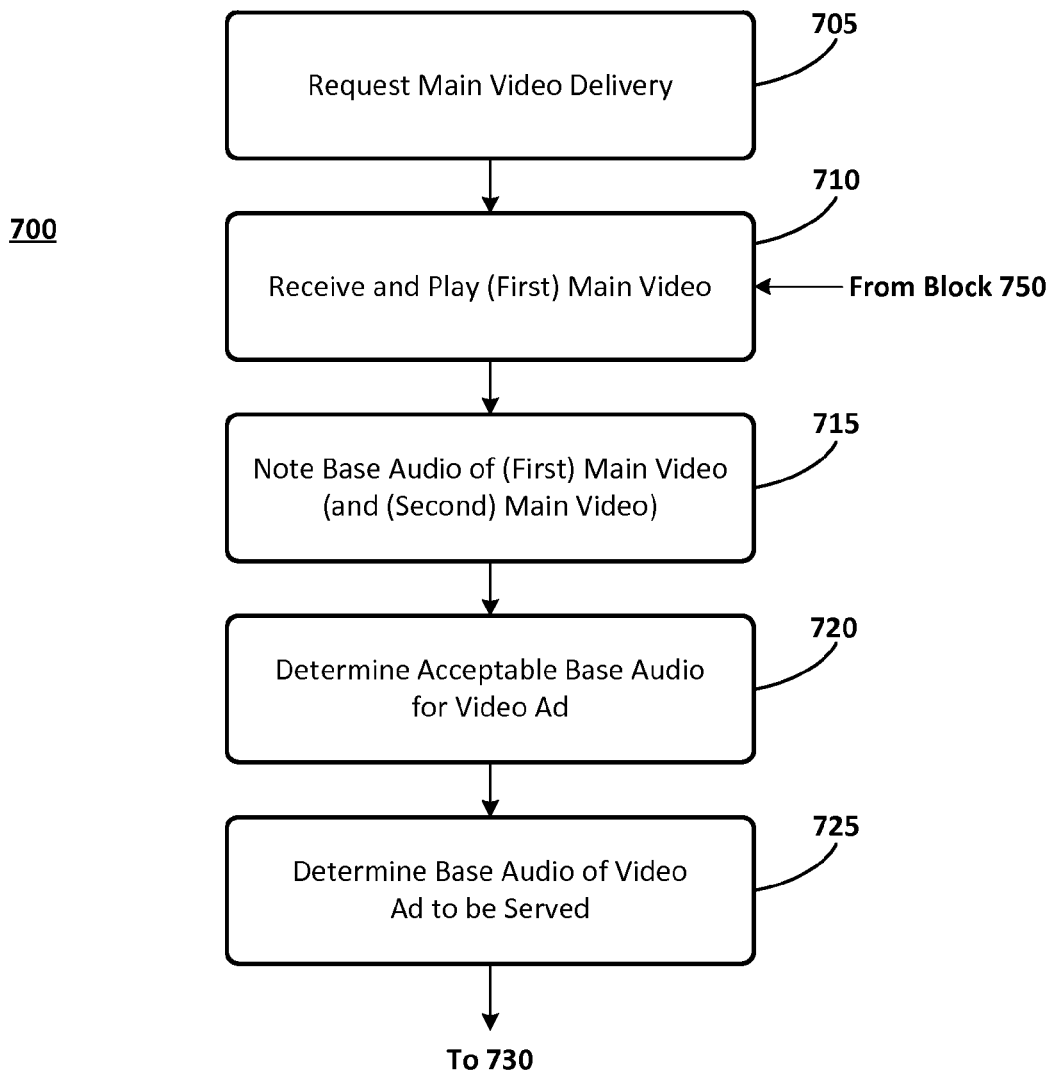
Figure 7B:
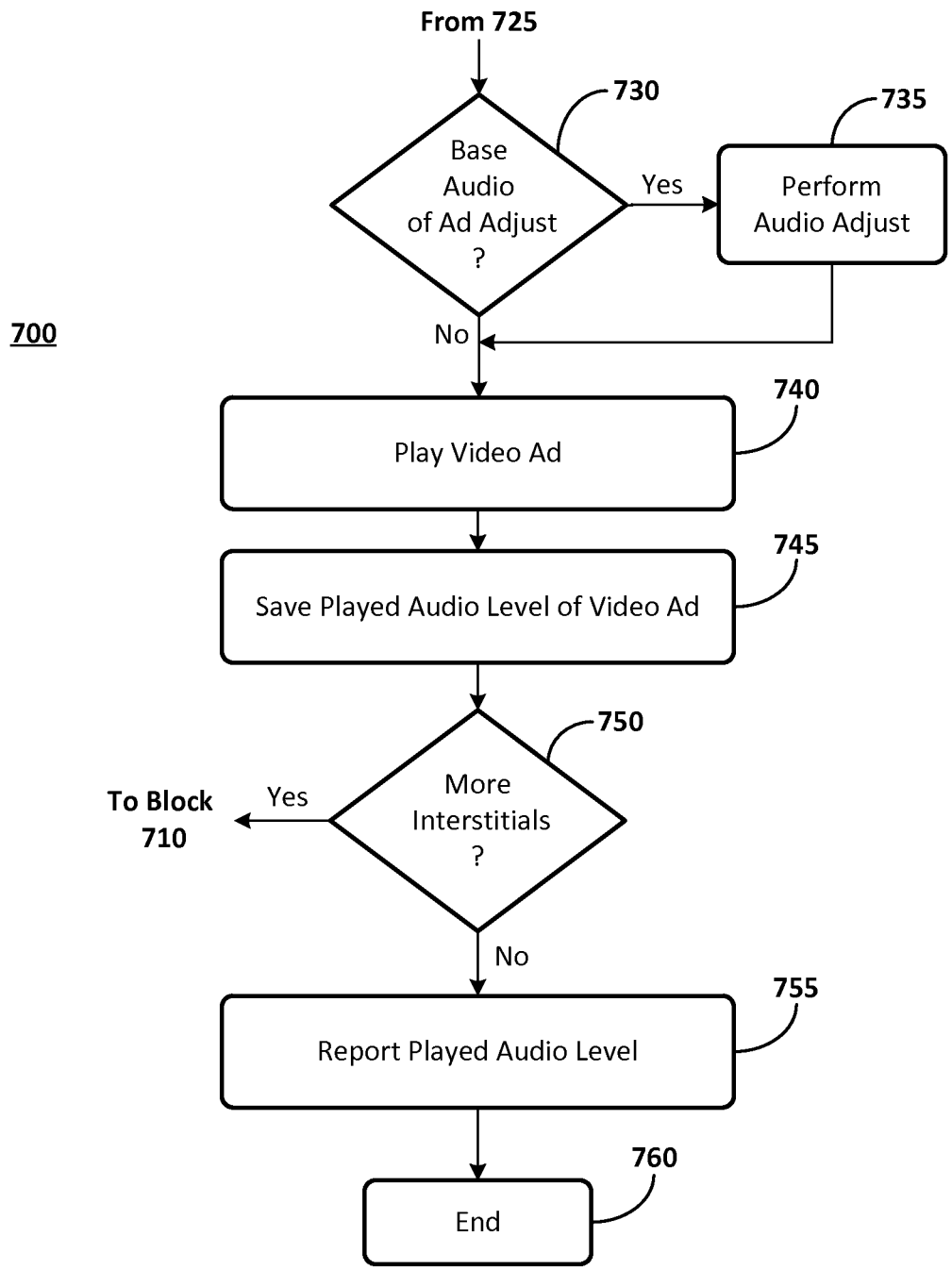

FIGS. 7A and 7B are flowcharts illustrating audio matching method 700. The example audio matching method 700 is described from the perspective of media device 24A of FIG. 1. Method 700 begins in block 705 when the viewer 22 operates the media device to request delivery of main videos from playlist 100. In block 710, the media player 29A receives and plays the first main video of the playlist 100. In block 715, the system 200 notes the base audio level of the last few frames of the first main video. Optionally, the system 200 also notes the base audio level of the first few frames of the second main video. In block 720, the system 200 determines an acceptable base audio level for a video advertisement that may be served in the interstitial between the first and second main videos. When base audio levels of the first and second main videos are used for the determination of block 720, the base audio level may be an average of the base audio levels. Alternately, the base audio level of the video advertisement may be changed during play of the video advertisement so as to match, at the beginning of the video advertisement, that of the base audio level of the last few frames of the first main video and at the end of the video advertisement, that of the base audio level of the first few frames of the second main video. Other options are available to scale, adjust or match the base audio level of the video advertisement to that of the main videos nearby the video advertisement.

In block 725, the system 200 determines the base audio level of the video advertisement to be served after play of the first main video. The system 200 may determine the base audio level on-the-fly; that is, by measuring the base audio as the video advertisement plays on the media player 29A. Alternately, the system 200 may determine the base audio level of the video advertisement by reference to metadata associated with the video advertisement and provided by the server 31. The metadata may be provided in advance of the play of any of the main videos. Alternately, the metadata may be provided on-the-fly, but sufficiently in advance of display of a main video so as to comply with the viewer's request for audio matching.

In block 730, the system 200 determines if the base audio level of the video advertisement requires adjustment. The base audio level of the video advertisement may not require adjustment for at least two reasons: first, the server 31 may have selected a video advertisement whose base audio level already matches that of the main video(s); second, the server 31 may already have adjusted the audio level. In block 730, if no audio adjustment is needed, the method 700 moves to block 740. In block 730, if the audio requires adjustment, the method 700 moves to block 735 and the system 200 performs an audio adjustment of the base audio of the video advertisement. The method 700 then moves to block 740.

In block 740, the media player 29A plays the video advertisement. In block 745, the system records or saves the played audio level of the video advertisement. The method 700 then determines, in block 750 if there are any remaining interstitials for which a video advertisement may be served. If other interstitials exist, the method 700 returns to block 710 and the processes of blocks 710-750 are repeated. If there are no more interstitials, the method 700 moves to block 755 and the system 200 reports as played audio levels of the video advertisements to the server 31. The method 700 then ends.

Figure 8:
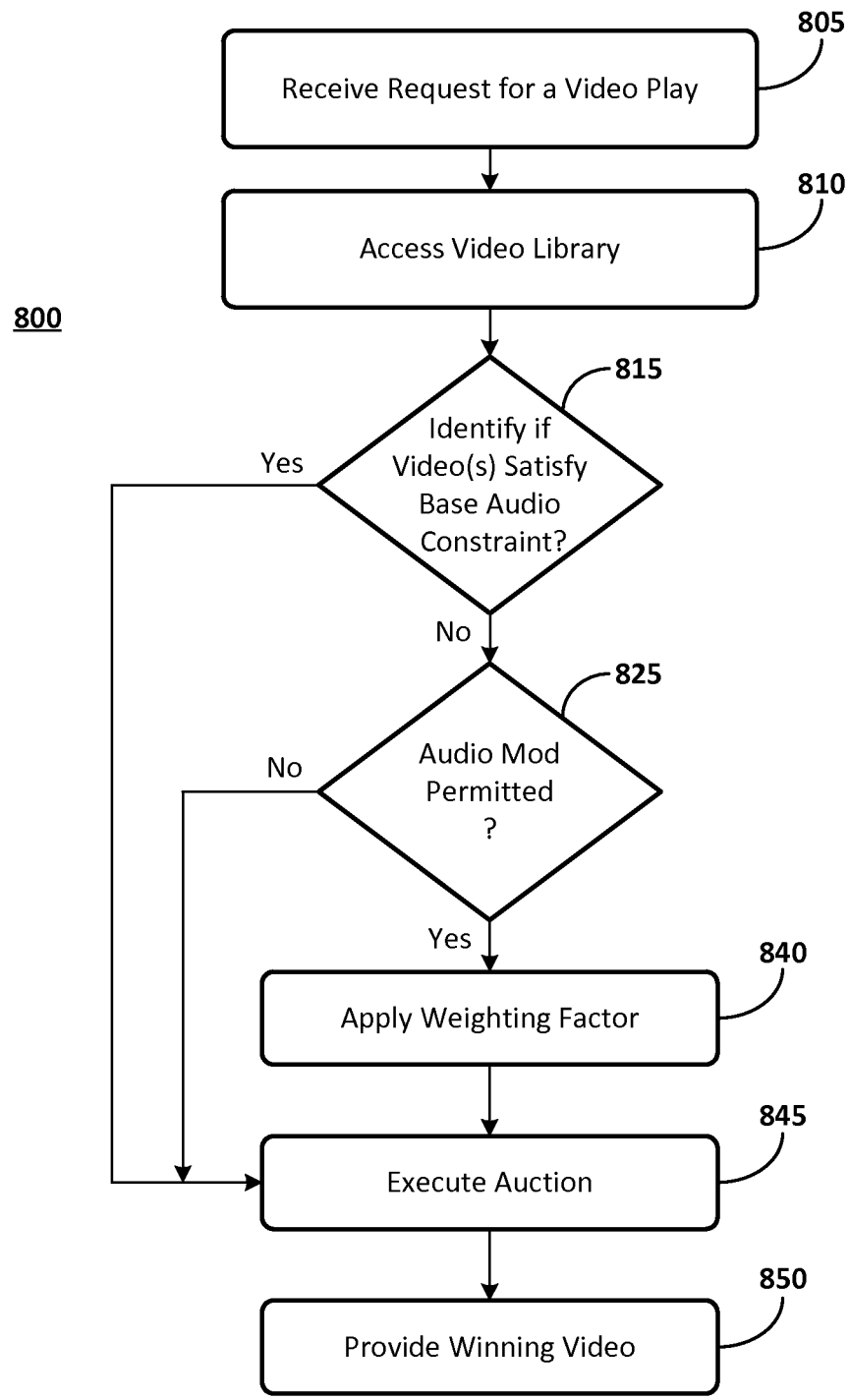

FIG. 8 is a flowchart illustrating an alternative method 800 for controlling audio levels of media content presented at a media device. The method 800 applies to videos and video advertisements, videos and multimedia advertisement, and videos and animated advertisements, or any combination of such advertisements (e.g., a number of main videos having interspersed video advertisements, multimedia advertisements, and animated advertisements). In addition, the method 800 applies to videos, multimedia, and animated main content segments in which are interspersed any combination of advertisements. Further, the method applies to multiple instances of main videos (i.e., to audio scaling, adjustment, and matching among multiple, distinct main videos such as among a dozen music videos, for example, whereby each of the dozen music videos may have its audio levels scaled, adjusted, or matched to a prescribed value).

In block 805, a server receives a request for a video play with a constrained base audio level In block 810, the server accesses a library of videos that may satisfy the request. In block 815, the server determines which, if any, of the videos in the library satisfy the base audio constraint (i.e., which videos have base audio levels that are less than the constraint). In block 815, if the server identifies videos that satisfy the constraint, the method 800 moves to block 845. Otherwise, the method moves to block 825. In block 825, the server determines if modification of the base audio is permitted for the videos in the library. If modification of the base audio is not permitted, the method 800 moves to block 845. If modification of the base audio is permitted, the method 800 moves to block 840 and the server applies a weighting factor to the videos. The method 800 then moves to block 845. In block 845, the server executes an auction to select a video to play in response to the request. In block 850, the server provides the video winning the auction.

Figure 9:
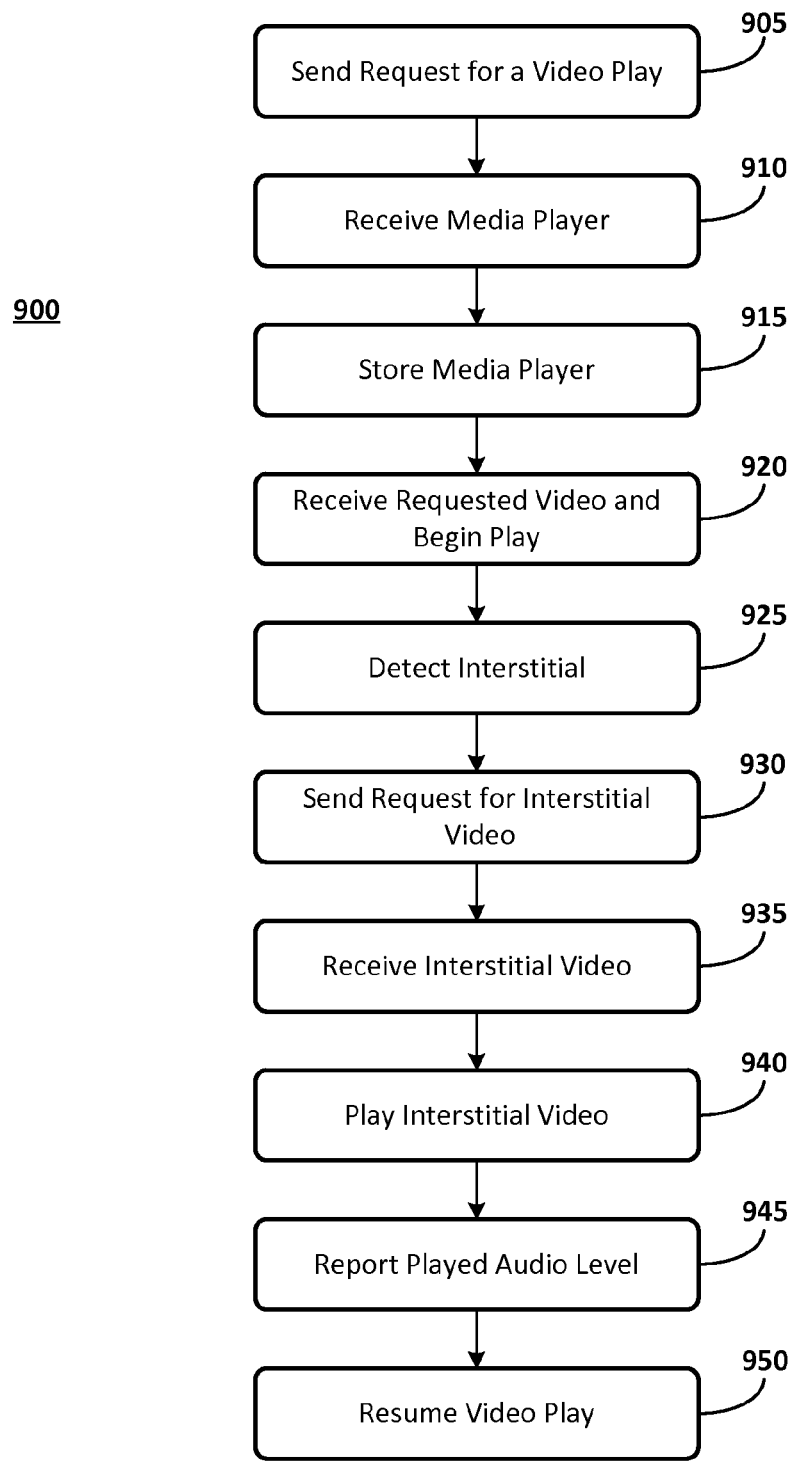

FIG. 9 is a flowchart illustrating another alternative method for controlling the audio of media content. The method may apply to play of one or more main videos along with the play of one or more interstitial videos.

In FIG. 9, audio control method 900 begins in block 905 when a media device sends a request to a remote server for a video play. In block 910, the media device receives a media player from the remote server. In block 915, the media device stores the media player. In block 920, the media device receives a requested video and the media player begins play of the media device. In block 925, the media player detects an impending slot in which an interstitial video may be played. In block 930, the media device sends a request for an interstitial video to play in the impending interstitial slot. In block 935, the media player receives an interstitial video in response to the request. In block 940, the media player plays the interstitial video. In block 945, the media player reports, to the server, the actual played audio level of the interstitial video. In block 950, the media player resumes play of the main video until completion. The method 900 then ends.

Figure 10A:
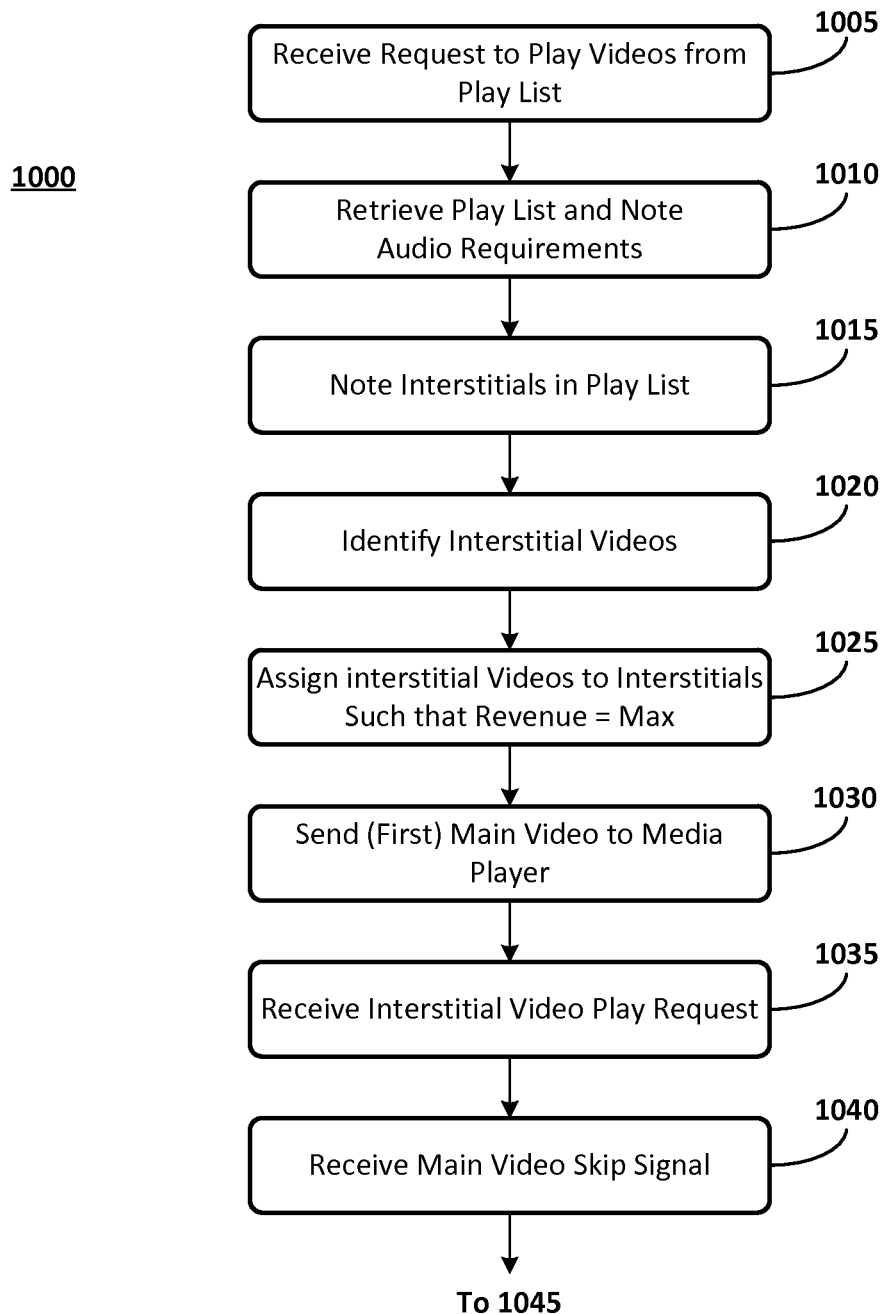
Figure 10B:
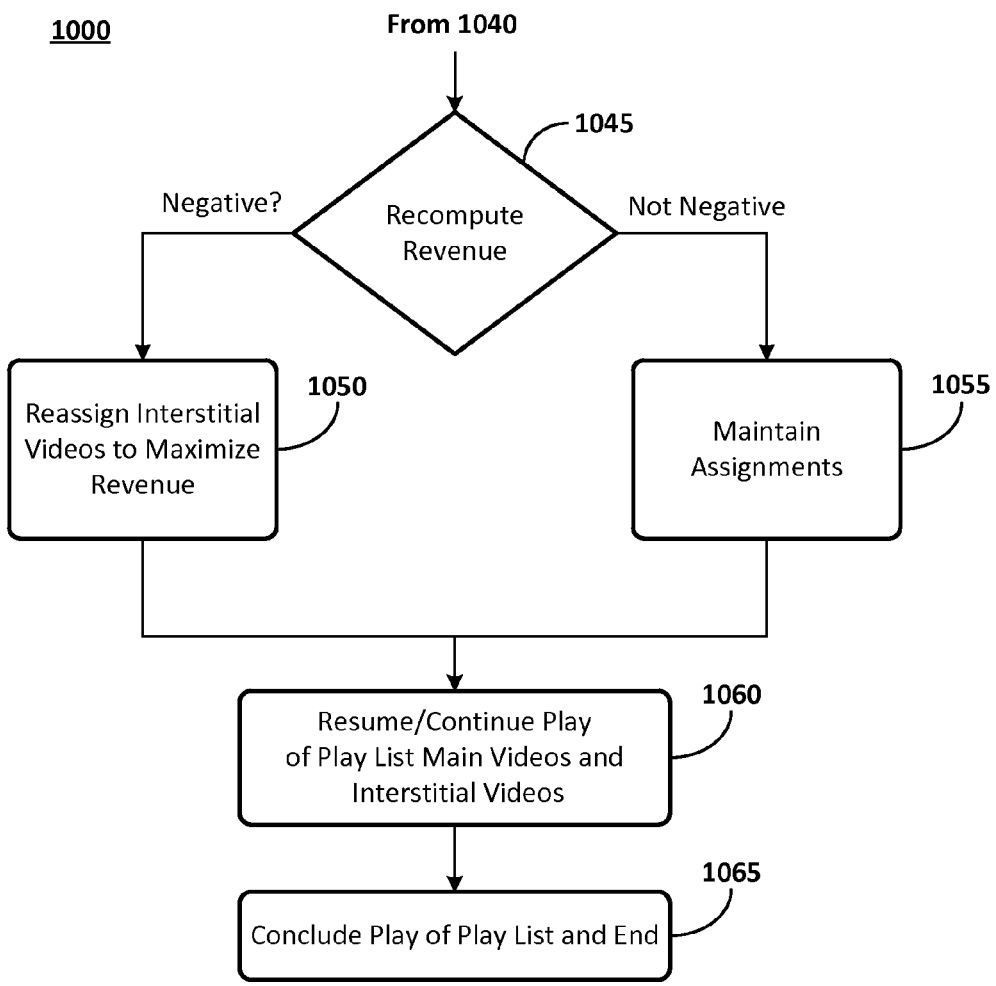

FIGS. 10A and 10B are flowcharts illustrating another process for controlling audio levels from programs playing on a media device. The illustrated example audio control process is based on playing a series of main videos interspersed with one or more interstitial videos (e.g., video advertisements).

In FIGS. 10A and 10B, audio control process 1000 begins in block 1005 when server 31 receives a request from media device 24A to play a series of main videos 36n that are referenced by playlist 100. The playlist 100 may be stored with the server 31. In response to the request of block 1005, in block 1010, the server 31 retrieves the playlist 100 and notes that the playlist 100 is annotated to request any interstitial videos 46n be played with a predetermined base audio level. Optionally, the playlist 100 also may be annotated to limit the maximum or high level audio of any interstitial videos 46n (i.e., the playlist 100 may be annotated to limit the audio spectrum of any interstitial videos 46n).

In block 1015, the server 31 notes possible interstitials 101n in the playlist 100. In block 1020, the server identifies interstitial videos 46n to serve in one or more of the interstitials 101n. In block 1025, the server 31 assigns the interstitial videos 46n to respective interstitials 101n. Thus, interstitial video 462 may be assigned to interstitial 1012. The assignment of interstitial videos 46n to interstitials 101n may be based on a number of factors. In one aspect, the assignment is based on maximizing the revenue from the overall interstitial assignment, assuming each assigned interstitial video 46n plays (i.e., the viewer 22 does not terminate the media player 29A). Thus, the order of interstitial videos 46n to main videos 36n may determine the maximum revenue derived from playing the main videos 36n and the assigned interstitial videos 46n. In this aspect then, when an interstitial video 46n is assigned to an interstitial 101n, the actual assignment may be chosen so that a specific interstitial video 46n follows a specific main video 36n. This may be because the viewer 22 may shuffle the order of playing the main videos 36n, or may skip one or more main videos 36n. Such actions by the viewer 22 may, for example, determine if a specific interstitial video 46n plays at all.

In block 1030, the server 31 sends to the media player 29A a (first) main video 361. In block 1035, the server 31 receives a request to play the (first) interstitial video 461. The process 1000 may continue thus, until all main videos play and all interstitial videos are served. However, in block 1040, the server 31 receives a request from the media player 29A to skip (i.e., not play) main video 363. In block 1045, the server reevaluates the assignment of interstitial videos to interstitials with main video 363 not playing. If in block 1045, the total revenue is negatively affected, the server 31 reassigns interstitial videos $46_n$, block 1050, to interstitials $101_n$. If the total revenue is not negatively affected, the server 31 does not make the reassignment, block 1055. In block 1060, the server 31 resumes normal play of the playlist 100. In block 1065, play of the playlist 100 concludes and the process 1000 ends.

The above disclosure generally refers to media as video. However, the systems and methods may apply to any type of media, including radio. In generally, the disclosure relates to an audio matching system and a corresponding audio matching method for controlling interstitial media in any media type. The method includes sending, by a processor, a request to an external server to deliver a plurality of main media segments to the media device; receiving, at the media device, a first main media segment playing, at the media device, the received first main media segment; determining, by the processor, audio parameters of the first main media segment; determining, by the processor, audio parameters of a first interstitial media segment to be served in proximity to the first main media segment; determining, by the processor, when the audio parameters of the first interstitial media segment require adjustment to match those of the first main media segment; when audio parameter adjustment is required, adjusting, by the processor, the audio parameters of the first interstitial media segment; and playing the first main video followed by the first interstitial video.

Certain of the devices shown in the herein described figures include a computing system. The computing system includes a processor (CPU) and a system bus that couples various system components including a system memory such as read only memory (ROM) and random access memory (RAM), to the processor. Other system memory may be available for use as well. The computing system may include more than one processor or a group or cluster of computing system networked together to provide greater processing capability. The system bus may be any of several types of bus structures including a memory bus or memory controller, a peripheral bus, and a local bus using any of a variety of bus architectures. A basic input/output (BIOS) stored in the ROM or the like, may provide basic routines that help to transfer information between elements within the computing system, such as during start-up. The computing system further includes data stores, which maintain a database according to known database management systems. The data stores may be embodied in many forms, such as a hard disk drive, a magnetic disk drive, an optical disk drive, tape drive, or another type of computer readable media which can store data that are accessible by the processor, such as magnetic cassettes, flash memory cards, digital versatile disks, cartridges, random access memories (RAM) and, read only memory (ROM). The data stores may be connected to the system bus by a drive interface. The data stores provide nonvolatile storage of computer readable instructions, data structures, program modules and other data for the computing system.

To enable human (and in some instances, machine) user interaction, the computing system may include an input device, such as a microphone for speech and audio, a touch sensitive screen for gesture or graphical input, keyboard, mouse, motion input, and so forth. An output device can include one or more of a number of output mechanisms. In some instances, multimodal systems enable a user to provide multiple types of input to communicate with the computing system. A communications interface generally enables the computing device system to communicate with one or more other computing devices using various communication and network protocols.

The preceding disclosure refers to a flow chart and accompanying description to illustrate the embodiments represented in FIGS. 5-10B. The disclosed devices, components, and systems contemplate using or implementing any suitable technique for performing the steps illustrated. Thus, FIGS. 5-10B are for illustration purposes only and the described or similar steps may be performed at any appropriate time, including concurrently, individually, or in combination. In addition, many of the steps in the flow charts may take place simultaneously and/or in different orders than as shown and described. Moreover, the disclosed systems may use processes and methods with additional, fewer, and/or different steps.

Embodiments disclosed herein can be implemented in digital electronic circuitry, or in computer software, firmware, or hardware, including the herein disclosed structures and their equivalents. Some embodiments can be implemented as one or more computer programs, i.e., one or more modules of computer program instructions, encoded on computer storage medium for execution by one or more processors. A computer storage medium can be, or can be included in, a computer-readable storage device, a computer-readable storage substrate, or a random or serial access memory. The computer storage medium can also be, or can be included in, one or more separate physical components or media such as multiple CDs, disks, or other storage devices. The computer readable storage medium does not include a transitory signal.

The herein disclosed methods can be implemented as operations performed by a processor on data stored on one or more computer-readable storage devices or received from other sources.

A computer program (also known as a program, module, engine, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code).

A computer program can be deployed to be executed on one computer or on multiple computers that are located at one site or distributed across multiple sites and interconnected by a communication network.

What is claimed is:

1. A computer-implemented method, comprising:
   sending, by a processor of a media device, a request to an external server to deliver a plurality of main media segments to the media device;
   receiving, at the media device, a first main media segment to be played before a second main media segment;
   playing, at the media device, the first main media segment;
   in response to determining that modification of audio parameters of a first interstitial media segment is allowed, selecting the first interstitial media segment to be played after the first main media segment and before the second main media segment, the audio parameters of the first interstitial media segment comprising a base audio level and an audio spectrum of the first interstitial media segment;

determining audio parameters of the first main media segment and audio parameters of the second main media segment, wherein the audio parameters of the first main media segment comprise a base audio level and an audio spectrum of the first main media segment, and the audio parameters of the second main media segment comprise a base audio level and an audio spectrum of the second main media segment;

determining that the audio parameters of the first interstitial media segment are to be adjusted to correspond to the audio parameters of the first main media segment and the audio parameters of the second main media segment;

adjusting the base audio level of the first interstitial media segment to correspond to, at a beginning of the first interstitial media segment, the base audio level of the first main media segment and, at an end of the first interstitial media segment, to the base audio level of the second main media segment, and scaling an upper audio level of the audio spectrum of the first interstitial media segment based on the audio spectrum of the first main media segment and the audio spectrum of the second main media segment; and playing the first interstitial media segment after the first main media segment.

2. The method of claim 1, wherein the plurality of main media segments comprises a media playlist; and wherein the media playlist is stored on a server remote from the media device.

3. The method of claim 1, wherein determining the audio parameters of the first main media segment comprises determining the audio parameters of a last portion of the first main media segment.

4. The method of claim 3, wherein determining the audio parameters of the last portion of the first main media segment comprises determining the base audio level of the last portion of the first main media segment.

5. The method of claim 1, wherein determining the audio parameters of the second main media segment comprises determining the audio parameters of a first portion of the second main media segment.

6. The method of claim 5, wherein determining the audio parameters of the first portion of the second main media segment comprises determining the base audio level of the first portion of the second main media segment.

7. The method of claim 1, wherein the base audio level of the first interstitial media segment is to be changed during play of the first interstitial media segment to match, at the beginning of the first interstitial media segment, the base audio level of a last portion of the first main media segment and at the end of the first interstitial media segment, the base audio level of a first portion of the second main media segment.

8. The method of claim 6, further comprising determining the base audio level of the first interstitial media segment by measuring the base audio level of the first interstitial media segment while the first interstitial media segment plays on the media device.

9. The method of claim 6, further comprising determining the base audio level of the first interstitial media segment by reference to metadata associated with the first interstitial media segment and provided by a remote server.

10. The method of claim 9, further comprising receiving the metadata in advance of play of any of the plurality of main media segments.

11. The method of claim 1, wherein the first interstitial media segment is received with audio parameters matching audio parameters of the first main media segment.

12. The method of claim 11, wherein the first interstitial media segment is received with the audio parameters of the first interstitial media segment matching audio unmodified from an initial value.

13. The method of claim 11, wherein the first interstitial media segment is received with audio parameters modified by the external server.

14. The method of claim 1, further comprising reporting, to the external server, modifications to the audio parameters of the first interstitial media segment.

15. The method of claim 1, wherein the media device is a radio and the plurality of main media segments and the first interstitial media segment are audio media segments received at the radio.

16. A non-transitory computer readable storage medium, having instructions stored therein, which when executed by a processing device of a media device, cause the processing device to perform operations comprising:

sending, by the processing device, a request to an external server to deliver a plurality of main media segments to the media device;

receiving, at the media device, a first main media segment to be played before a second main media segment;

playing, at the media device, the first main media segment;

in response to determining that modification of audio parameters of a first interstitial media segment is allowed, selecting the first interstitial media segment to be played after the first main media segment and before the second main media segment, the audio parameters of the first interstitial media segment comprising a base audio level and an audio spectrum of the first interstitial media segment;

determining audio parameters of the first main media segment and audio parameters of the second main media segment, wherein the audio parameters of the first main media segment comprise a base audio level and an audio spectrum of the first main media segment, and the audio parameters of the second main media segment comprise a base audio level and an audio spectrum of the second main media segment;

determining that the audio parameters of the first interstitial media segment are to be adjusted to correspond to the audio parameters of the first main media segment and audio parameters of the second main media segment;

adjusting the base audio level of the first interstitial media segment to correspond to, at a beginning of the first interstitial media segment, the base audio level of the first main media segment and, at an end of the first interstitial media segment, to the base audio level of the second main media segment, and scaling an upper audio level of the audio spectrum of the first interstitial media segment based on the audio spectrum of the first main media segment and the audio spectrum of the second main media segment; and playing the first interstitial media segment after the first main media segment.

17. The non-transitory computer readable storage medium of claim 16, wherein the plurality of main media segments comprises a media playlist; and wherein the media playlist is stored on a server remote from the media device.

18. The non-transitory computer readable storage medium of claim 16, wherein determining the audio parameters of the first main media segment comprises determining the audio parameters of a last portion of the first main media segment.

19. The non-transitory computer readable storage medium of claim 16, wherein determining the audio parameters of the second main media segment comprises determining the audio parameters of a first portion of the second main media segment.

20. A system for a media device, comprising:
a memory; and
a processing device, coupled to the memory, to:
send a request to an external server to deliver a plurality of main media segments to the media device;
receive a first main media segment to be played before a second main media segment;
play the first main media segment;
in response to determining that modification of audio parameters of a first interstitial media segment is allowed, selecting the first interstitial media segment to be played after the first main media segment and before the second main media segment, the audio parameters of the first interstitial media segment comprising a base audio level and an audio spectrum of the first interstitial media segment;
determine audio parameters of the first main media segment and audio parameters of the second main media segment, wherein the audio parameters of the first main media segment comprise a base audio level and an audio spectrum of the first main media segment, and the audio parameters of the second main media segment comprise a base audio level and an audio spectrum of the second main media segment;
determine that the audio parameters of the first interstitial media segment are to be adjusted to correspond to the audio parameters of the first main media segment and audio parameters of the second main media segment;
adjust the base audio level of the first interstitial media segment to correspond to, at a beginning of the first interstitial media segment, the base audio level of the first main media segment and, at an end of the first interstitial media segment, to the base audio level of the second main media segment, and scale an upper audio level of the audio spectrum of the first interstitial media segment based on the audio spectrum of the first main media segment and the audio spectrum of the second main media segment; and
play the first interstitial media segment after the first main media segment.

* * * * *